United States Patent
Nishio

(10) Patent No.: US 11,027,341 B2
(45) Date of Patent: Jun. 8, 2021

(54) DIMPLE PROCESSING METHOD USING ROTARY CUTTING TOOL, AND ROTARY CUTTING TOOL FOR DIMPLE PROCESSING

(71) Applicant: KANEFUSA KABUSHIKI KAISHA, Aichi (JP)

(72) Inventor: Satoru Nishio, Aichi (JP)

(73) Assignee: KANEFUSA KABUSHIKI KAISHA, Aichi-ken (JP)

( * ) Notice: Subject to any disclaimer, the term of this patent is extended or adjusted under 35 U.S.C. 154(b) by 307 days.

(21) Appl. No.: 16/068,082

(22) PCT Filed: Dec. 21, 2016

(86) PCT No.: PCT/JP2016/088119
§ 371 (c)(1),
(2) Date: Jul. 3, 2018

(87) PCT Pub. No.: WO2017/119298
PCT Pub. Date: Jul. 13, 2017

(65) Prior Publication Data
US 2020/0282478 A1    Sep. 10, 2020

(30) Foreign Application Priority Data
Jan. 6, 2016    (JP) .............................. JP2016-001112

(51) Int. Cl.
*B23C 5/12* (2006.01)
*B23C 5/10* (2006.01)
*B23C 3/10* (2006.01)

(52) U.S. Cl.
CPC .................. *B23C 5/12* (2013.01); *B23C 5/10* (2013.01); *B23C 3/10* (2013.01);
(Continued)

(58) Field of Classification Search
CPC ....... B23C 5/12; B23C 3/10; B23C 2215/242; B23C 2220/48; B23C 2210/242; B23C 2210/088; B23C 2210/084
See application file for complete search history.

(56) References Cited

U.S. PATENT DOCUMENTS 2,890,627 A * 6/1959 Onksen .................... B23C 3/20
                                                           409/132
3,841,199 A * 10/1974 Jepson ................. B23Q 1/0009
                                                           409/80
(Continued)

FOREIGN PATENT DOCUMENTS

EP         3311944 A1 *  4/2018    ............... B23C 3/10
JP         S6334010 A   2/1988
(Continued)

OTHER PUBLICATIONS

PCT/JP2016/088119 International Search Report and Written Opinion dated Mar. 14, 2017 (9 p.).
(Continued)

*Primary Examiner* — Ryan C Rufo
(74) *Attorney, Agent, or Firm* — Conley Rose, P.C.

(57) ABSTRACT

An end mill having a plurality of cutting edges on a surface of a rod-shaped main body is rotated about its longitudinal axis and is moved relative to a workpiece in a feed direction tangential and orthogonal to the longitudinal axis along the workpiece. The end mill is also moved relative to the workpiece in a reciprocal manner in the axial direction while it is moved in the feed direction. In this way, a plurality of dimples are formed by the end mill on the workpiece, such that the dimples are relatively spaced apart from each other on the workpiece. The plurality of dimples are arranged side by side in the feed direction along a line inclined at a predetermined angle relative to the feed direction so as to be
(Continued)

offset while partially overlapping with respect to each other in the axial direction.

19 Claims, 12 Drawing Sheets

(52) U.S. Cl.
CPC .. *B23C 2210/084* (2013.01); *B23C 2210/242* (2013.01); *B23C 2220/48* (2013.01)

(56) References Cited

U.S. PATENT DOCUMENTS

| | | | | |
|---|---|---|---|---|
| 5,788,435 | A * | 8/1998 | McCarthy | G05B 19/402 409/187 |
| 6,726,413 | B1 * | 4/2004 | Stelson | B23C 3/00 409/132 |
| 9,925,603 | B2 | 3/2018 | Yajima | |
| 2006/0130331 | A1 * | 6/2006 | Takashima | B24B 19/028 29/896.6 |
| 2012/0017889 | A1 * | 1/2012 | Hack | B28B 11/08 126/680 |
| 2012/0096999 | A1 * | 4/2012 | Hyatt | B23B 3/22 82/1.11 |
| 2013/0152781 | A1 * | 6/2013 | Laimboeck | B23C 3/34 92/169.1 |
| 2014/0007748 | A1 | 1/2014 | Bhapkar et al. | |
| 2015/0056036 | A1 * | 2/2015 | Yasukochi | B23C 5/00 409/131 |
| 2018/0154461 | A1 * | 6/2018 | Nishio | B23C 5/10 |

FOREIGN PATENT DOCUMENTS

| | | | | |
|---|---|---|---|---|
| JP | H1052998 | A | 2/1998 | |
| JP | 2006263790 | A | 10/2006 | |
| JP | 2006326669 | A | 12/2006 | |
| JP | 2008246587 | A | 10/2008 | |
| JP | WO/2015/064114 | A1 | 3/2017 | |
| WO | WO-2019168070 | A1 * | 9/2019 | B23C 5/12 |
| WO | WO-2019202911 | A1 * | 10/2019 | B23C 5/10 |

OTHER PUBLICATIONS

European Search Report dated Jul. 5, 2019, for European Application No. 16883797.9 (6 p.).

* cited by examiner

DIMPLE PROCESSING METHOD USING ROTARY CUTTING TOOL, AND ROTARY CUTTING TOOL FOR DIMPLE PROCESSING

CROSS-REFERENCE TO RELATED APPLICATIONS

The present application is a National Phase application of PCT Application No. PCT/JP2016/088119, filed Dec. 21, 2016, which claims priority to Japanese Patent Application No. 2016-001112, filed Jan. 6, 2016, both of which are incorporated by reference herein in their entireties for all purposes.

STATEMENT REGARDING FEDERALLY SPONSORED RESEARCH OR DEVELOPMENT

Not applicable.

BACKGROUND

The present invention relates to a dimple processing method, and a rotary cutting tool for dimple processing for forming dimples, such as small recesses, on a surface of a workpiece by a rotary cutting tool.

A plurality of dimples such as small recesses may be formed on a surface of a workpiece that may be made of aluminum, copper alloy, casted product thereof, cast iron, resin, or the like. For example, the plurality of dimples may form a satin pattern on the surface of the workpiece. The dimples are formed on the workpiece to reduce the frictional resistance between the workpiece and a counter piece in sliding contact with the workpiece. Typically, when the workpiece comes into sliding contact with the counter piece, abrasion powders are generated and accumulated between the workpiece and the counter piece, thereby causing galling on the surfaces of the workpiece and counter piece, which in turn may result in an increase in the frictional resistance. With the presence of the dimples, however, the increase in the frictional resistance due to the abrasion powders may be reduced when the abrasion powders are caught in the dimples. In another case, oil may be provided between the workpiece and the counter piece such that oil may be filled in the dimples. When the counter piece passes near the dimples, the oil will be discharged out of the dimples and into the space between the counter piece and the workpiece with high pressure (squeezing effect). As a result, this pressure prevents the counter piece from coming into contact with the workpiece, thus reducing the frictional resistance between the counter piece and the workpiece.

In general, the dimples may be formed on a piston of an engine, an inner wall of a tubular member such as a cylinder, turbo charger, etc. of an engine and/or a joining faces of an artificial joint, or the like. A method for processing the dimples by laser irradiation, a method by shot peening in which microbeads collide with a workpiece at high speed, and the like are known. When using the laser irradiation method, the workpiece is heated to a high temperature. Consequently, problems due to large thermal stress being applied to the workpiece, such as dross (molten material) adhering to the workpiece, may arise. In the case of dross, it is difficult to remove bulging and dross that is formed by use of the laser. When using the shot peening method, bulges may be formed around the dimples so that the workpiece may not be flat. In addition, residual stress may be generated around the dimples and may cause deformation or breakage of the workpiece.

Japanese Laid-Open Patent Publication No. 10-052998 discloses a method for decorating a surface of a workpiece using a rotary cutting tool, such as a milling cutter, end mill cutter, or the like. With this method, the cutting edges of the rotary cutting tool are slightly brought in contact with the surface of the workpiece while the rotary cutting tool is rotated. In this way, a polka-dot pattern having a plurality of circles can be formed on the surface of the workpiece. The circles are then formed so as to be arranged so as to be parallel to the axial direction of the rotary cutting tool and are formed at equal intervals in the feed direction orthogonal to the axial direction.

BRIEF SUMMARY

It has been conventionally desired to reduce frictional resistance more uniformly by the use of dimples, and to collect abrasion powders to a greater degree within the dimples. It has also been desired to prevent burrs from building around the dimples, and to prevent the area surrounding the dimples from bulging. Therefore, a method for processing such dimples by the rotary cutting tool has been conventionally required. Additionally, a rotary cutting tool for processing such dimples has been desired.

One aspect of the present invention relates to a dimple processing method for forming dimples on a workpiece by using a rotary cutting tool. The present dimple processing method comprises rotating a rotary cutting tool about an axis thereof and moving the rotary cutting tool relative to a workpiece in a feed direction oriented orthogonal to the axis of rotation wherein the rotary cutting tool has a plurality of cutting edge portions on an exterior surface of a rod-shaped main body. The method further comprises moving the rotary cutting tool relative to the workpiece in an axial direction in addition to the movement of the rotary cutting tool relative to the workpiece in the feed direction, resulting in the formation of a plurality of dimples that are spaced apart from each other on the workpiece. The plurality of dimples are arranged side by side in the feed direction so as to be displaced in the axial direction while partially overlapping with each other in the axial direction.

Therefore, the plurality of dimples arranged side by side in the feed direction are partially overlap with each other so as to be displaced in the axial direction. As a result, the dimples are distributed in the axial direction and may be arranged such that the dimples are always present in the axial direction when the workpiece is viewed in the feed direction.

Consequently, when a counter piece is moved relative to the workpiece in the feed direction, the large part of the counter piece is affected by any of the dimples distributed in the axial direction. More specifically, the abrasion powder generated between the workpiece and the counter piece may be shifted in the feed direction and captured in the dimples distributed in the axial direction. Alternatively, the squeezing effect, which may be caused by the dimples, may be generated in a distributed manner in the axial direction. As a result, the frictional resistance between the workpiece and the counter piece may be reduced and the wear resistance of the workpiece may be improved.

A dimple processing method according to another aspect of the present invention comprises rotating a rotary cutting tool about an axis thereof and moving the rotary cutting tool relative to a workpiece in a feed direction oriented orthogonal to the axis wherein the rotary cutting tool has a plurality of cutting edge portions on a surface of a rod-shaped main body. In this manner, the workpiece is formed with a plurality of dimples which are spaced apart from each other. The plurality of cutting edge portions are arranged side by side on a lead edge line having a lead angle relative to a line oriented parallel to the axis on a surface of the main body of the rotary cutting tool. A plurality of dimples arranged side by side in the feed direction are formed on a line at an angle relative to the axis as the rotary cutting tool is moved in the feed direction while being rotated about the axis.

Therefore, the plurality of dimples arranged side by side in the axial direction are positioned with partially overlapped and displaced each other in the feed direction. As a result, the dimples are distributed in the feed direction and may be arranged such that the dimples must always be found when the workpiece is viewed in the axial direction.

Consequently, when a counter piece is moved relative to the workpiece in the axial direction, the large part of the counter piece is affected by any of the dimples distributed in the feed direction. More specifically, the abrasion powder generated between the workpiece and the counter piece may be shifted in the axial direction and captured in the dimples distributed in the feed direction. Alternatively, the squeezing effect, which may be caused by the dimples, may be generated in a distributed manner in the feed direction. As a result, the frictional resistance between the workpiece and the counter piece may be reduced and the wear resistance of the workpiece may be improved.

DETAILED DESCRIPTION

Figure 1:
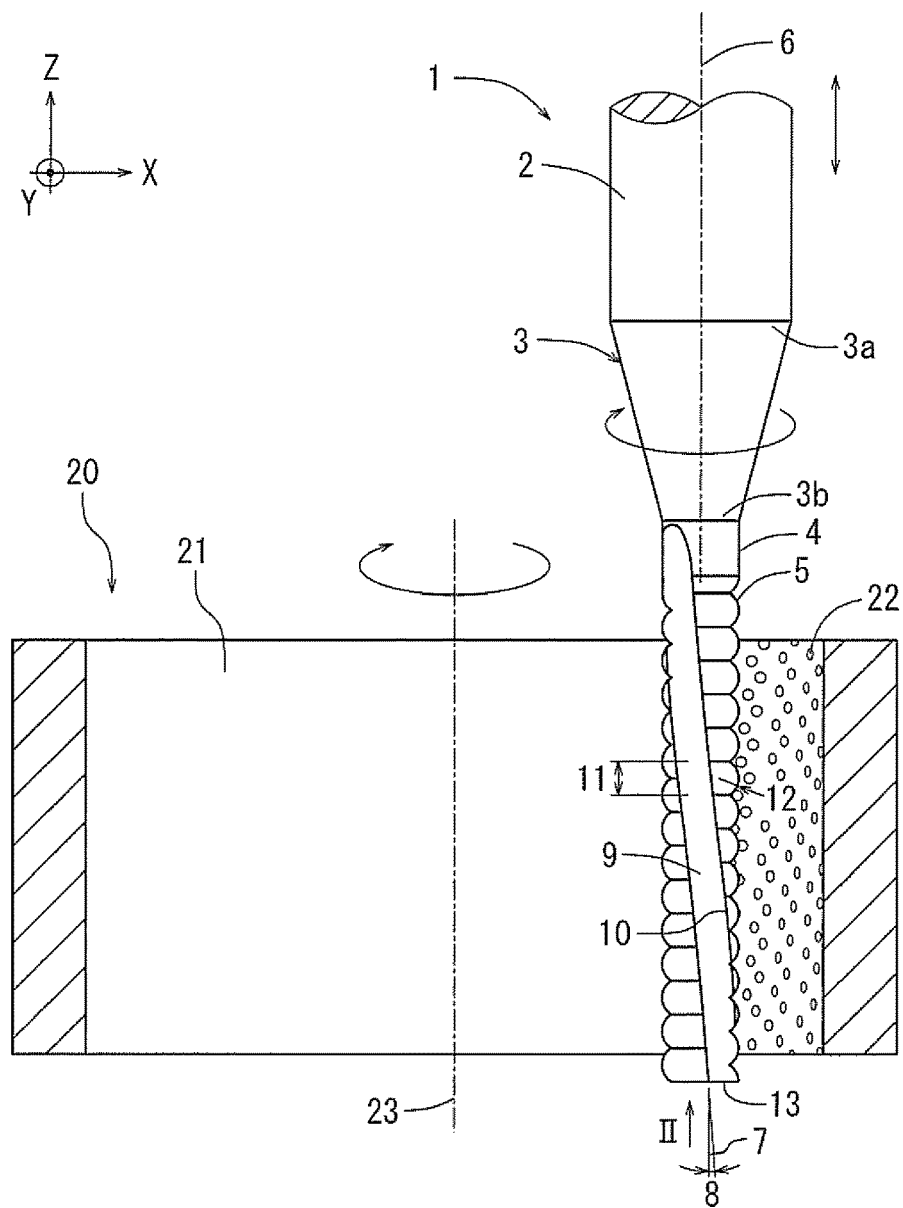
FIG. 1 is a cross sectional view of a workpiece having a cylindrical inner wall and a front view of an end mill.

One exemplary embodiment according to the present invention will be described with reference to FIGS. 1 to 8, with the X, Y, and Z directions as shown in FIG. 1 (the Y direction is oriented perpendicular to the page). As shown in FIG. 1, an end mill 1 is a rotary cutting tool configured to form a plurality of dimples (small recesses) spaced apart from each other along the surface of a workpiece. The end mill 1 is made of cemented carbide in a generally round, cylindrical rod shape. In particular, end mill 1 extends continuously downward in the negative Z direction along a longitudinal axis 6. In addition, end mill 1 includes a shank 2, a connecting portion (neck) 3, and a main body 4. The shank 2 has a cylindrical shape extending radially outward to a greater extent than the main body 4 in the embodiment as shown in FIG. 1, and is mounted on a spindle 106 of a processing apparatus 100 as shown in FIG. 4. In general, the shank 2 may have the same diameter as the main body 4, or larger diameter than the diameter of the main body 4 as shown in the embodiment in FIG. 1, where a larger size may be used when it is desired to increase rigidity. The connecting portion 3 has an inverted truncated conical shape with a large diameter portion 3a at its upper end (highest circular cross-sectional XY plane in the Z direction) that is the same diameter as the shank 2 and a small diameter portion 3b at its lower end (lowest circular cross-sectional XY plane in the Z direction) that is the same diameter as the main body 4.

Figure 2:
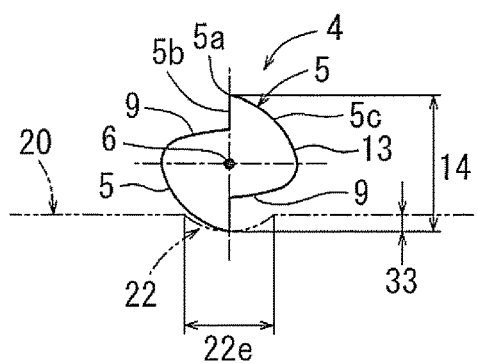
FIG. 2 is a bottom end view of the end mill as viewed along arrow II in FIG. 1.

As shown in FIGS. 1 and 2, the main body 4 has a substantially round cylindrical shape with a relatively small diameter, and extends downward in the Z direction from the lower end of the connecting portion 3. The main body 4 may be formed with at least one, for example, or two circumferentially spaced grooves (flutes) 9. The grooves 9 are helically formed around the radially outer surface of the main body 4 and have a lead angle 8 with respect to the line 7 that is oriented parallel to the longitudinal axis 6 of end mill 1 and disposed at the same XY location as longitudinal axis 6. The grooves 9 axially at the lead angle 8 with respect to the longitudinal axis 6 around the radially outer surface of the main body 4. The lead angle 8 is in the range of 1 to 40 degrees such as 6 degrees, and is preferably at least 2 degrees. The groove extends downward at the lead angle 8 angle over approximately half of the circumference of the main body 4 from top to bottom in the Z-direction. Each groove 9 has a predetermined width (edge-to-edge distance in the X direction) and extends over substantially the entire length of the main body 4 in the negative Z direction, along the longitudinal direction along axis 6.

As shown in FIG. 1, each groove 9 extends in a counter-clockwise direction (when viewed from the top of FIG. 1) in the top-to-bottom negative Z direction, from the connecting portion 3 to the leading end 13 of the main body 4. The main body 4 includes a plurality of axially adjacent, circumferentially-extending cutting edge portions 5 disposed along body 4 from the top to the bottom of the groove 9 as shown in FIG. 1. As shown in FIG. 2, when the main body 4 is viewed from the bottom in the axial direction along axis 6, a pair of the cutting edge portions 5 are located on the main body 4 diagonally opposed about the axis 6 with respect to each other, and the grooves 9 are located circumferentially between the pair of the cutting edge portions 5, such that the grooves 9 are also diagonally opposed about the axis 6 with respect to each other. Each of the cutting edge portions 5 includes a circular arc flank face 5c, an outer peripheral cutting edge 5a located at one terminal circumferential end of the flank face 5c, and a rake face 5b extending radially inward from the outer peripheral cutting edge 5a toward the axis 6 and the groove 9. The flank face 5c extends circumferentially in a substantially circular arc along the outer periphery of the main body 4. More specifically, the flank face 5c has a configuration such that the outer peripheral cutting edge 5a is located at a circumferential terminal end of the arc of face 5c farthest away from the axis 6, where in traversing 5c from 5a to the opposite circumferential end of the arc of face 5c, the distance to axis 6 gradually decreases. The rake face 5b is configured in a planar shape or a curved shape.

Figure 3:
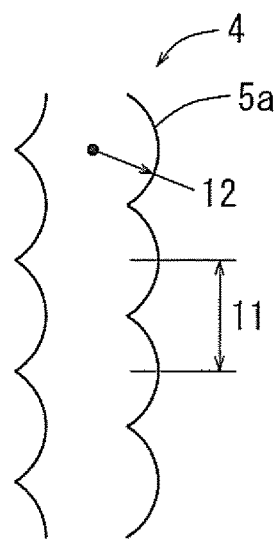
FIG. 3 is a projected view of an outer peripheral edge of the end mill of FIG. 1 when the end mill is viewed in a radial direction.
Figure 4:
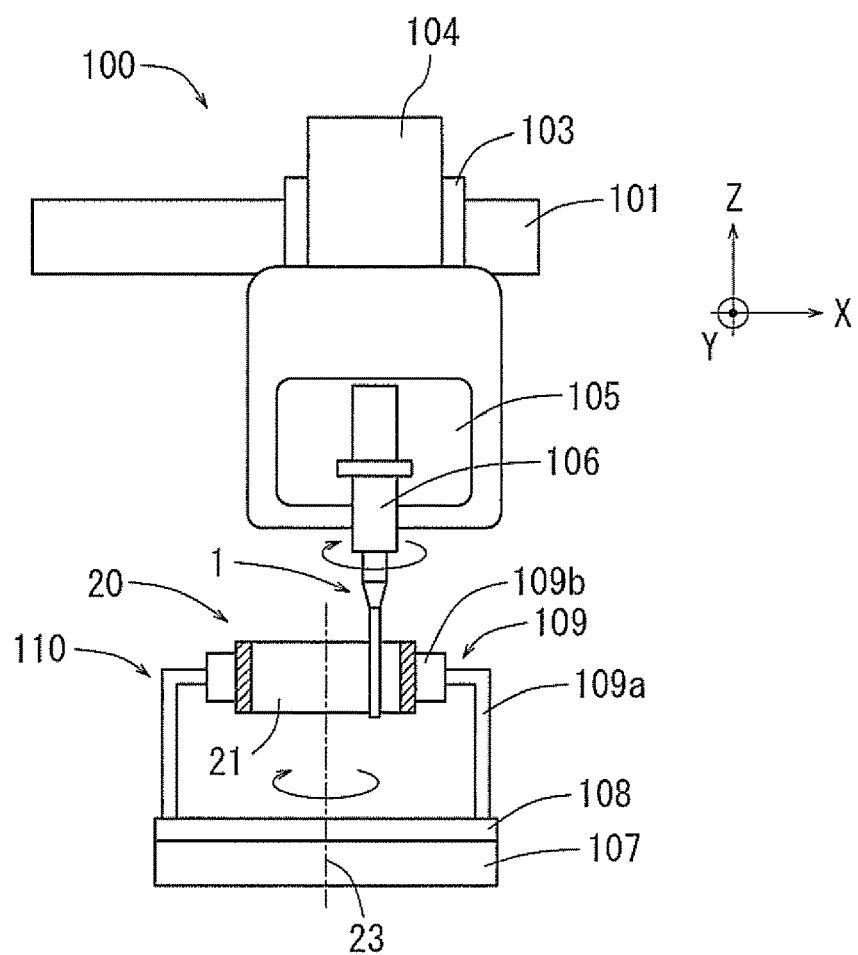
FIG. 4 is a schematic front view of a processing apparatus including the end mill of FIG. 1.

As shown in FIGS. 1 and 3, the groove 9 includes one end edge line (lead edge line 10) and another parallel end edge line, spaced apart by the width of groove 9 in the circumferential direction. The configuration of the edge lines are such that the one end lead edge line 10 is always ahead of the other end edge line by a constant predetermined distance in the rotational counter-clockwise circumferential direction, relative to a top view of the end mill 1 from the upper Z-direction looking downward. A plurality of the cutting edge portions 5 are formed along each end edge line of the groove 9. The plurality of the cutting edge portions 5 are formed continuously, arranged side by side and stacked in the Z-direction from top-to-bottom of the main body 4 with a predetermined axial distance 11 in the Z direction forming, for example, equal intervals as shown in FIG. 1. The continuous cutting edge portions 5 collectively define the outer peripheral edges extending along each groove 9, as a result the end mill 1 includes, two outer peripheral edges.

As shown in FIGS. 1 and 3, the outer peripheral edges of each groove 9 have a corrugated shape, comprising continuous arcuate peaks in the Z-direction. Troughs are located between axially adjacent cutting portions 5. Each of the cutting edge portions 5 corresponds to the arcuate peaks and protrudes outward in the radial direction of the main body 4. The corrugated pattern of the two peripheral edge lines is offset in the axial direction, for example, by half the pitch 11. To more clearly illustrate the axial offset of one peripheral edge relative to the other, the outer peripheral edge of each groove 9 is rotated or projected into a single plane in FIG. 3 for purposes of illustration. As shown in FIG. 3, the peaks (cutting edge portions 5) of one edge line are axially positioned between the troughs of the adjacent edge line. In the R-Z cross-sectional plane for each cutting edge portion 5, where R is the radius from axis 6 to the outer peripheral cutting edge 5a, the outer peripheral cutting edge 5a of each cutting edge portion 5 (see FIG. 2) has a substantially circular arc shape with a radius of curvature 12. The radius of curvature 12 may be dimensioned, for example, to be 70 to 130% of the radius of the main body 4.

As shown in FIG. 4, the end mill 1 is attached to the processing apparatus 100. The processing apparatus 100 includes an X-axis guide 101, an X-direction movable member 103 movable along said X-axis guide 101, a Y-direction movable member 104 movable in the Y-direction (going into and out of the page of the figure as shown in FIG. 4) relative to the X-direction movable member 103, and a Z-direction movable member 105 movable in the Z-axis direction relative to the Y-direction movable member 104. The X-axis guide 101 is supported on a support base (not shown) and extends in the X-axis direction.

The X-direction movable member 103 includes, for example, a nut of a feed screw mechanism. The nut is rotated by a servo motor (see FIG. 5, motor for movement 126) and moves relative to a screw shaft provided within the X-axis guide 101. Alternatively, the X-direction movable member 103 can also move relative to the X-axis guide 101 by using a rack and pinion mechanism instead of the aforementioned screw shaft, via the servo motor 126. The Y-direction movable member 104 and Z-direction movable member 105 can also move relative to the X-direction movable member 103 and Y-direction movable member 104, respectively, using either a feed screw mechanism or a rack and pinion mechanism, with a servo motor (see FIG. 5, where the motors for movement 127, 128 correspond to the Y and Z axis directions, respectively).

Figure 5:
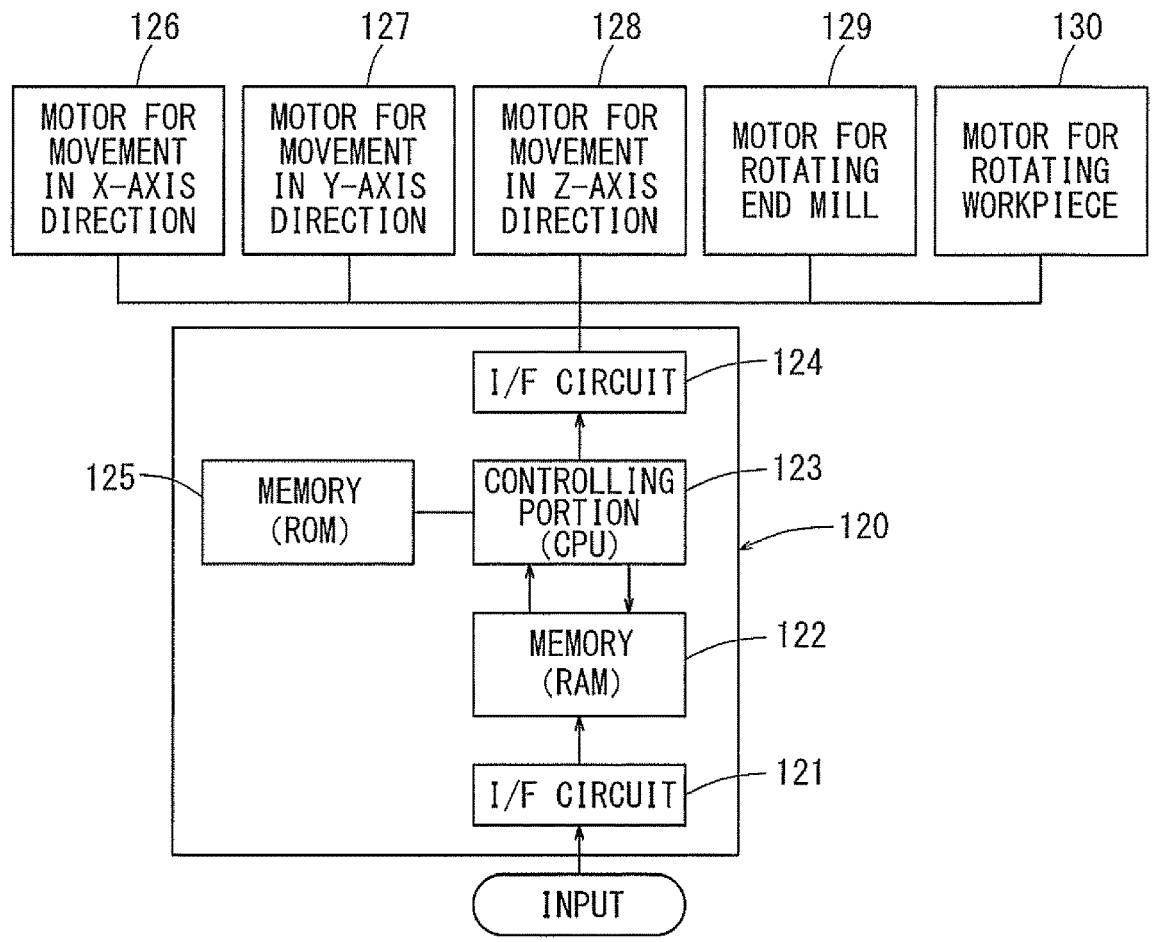
FIG. 5 is a schematic block diagram of the processing apparatus of FIG. 4 and a controller of a workpiece holding apparatus.

As shown in FIG. 4, the Z-direction movable member 105 is provided with a spindle 106 so as to be rotatable. The top of end mill 1 is attached to the bottom portion of spindle 106 so that the spindle 106 may rotate the end mill 1 about its longitudinal axis 6 by using the servo motor (see FIG. 5, motor for movement 128) or the like. The motion or rotation of each component of the processing apparatus 100 may be controlled by a controlling portion 123 stored within a PC 120 as shown in FIG. 5.

As shown in FIG. 4, the workpiece 20 is held by a workpiece holding apparatus 110. The workpiece holding apparatus 110 includes a base 107, a table 108 capable of rotating relative to the base 107, and a holder 109. The holder 109 includes arms 109a extending downward in the Z direction from the holder 109 to the table 108, as well as holding portions 109b attached to the upper ends of arms 109a and being adjustable in the positive and negative X directions relative to the arms 109a. In this manner, the pair of holding portions 109b may hold the workpiece 20 by changing the interval in the X direction therebetween. The table 108 rotates relative to the base 107 using, for example, the servo motor (see FIG. 5, motor 130 for rotating the workpiece 20) or the like while the servo motor (motor 130 for rotation) is controlled by the controlling portion 123 stored within the PC 120.

The workpiece 20 shown in FIGS. 1 and 4 is made of, for example, of aluminum and includes an inner wall 21, wherein the inner wall 21 may have a cylindrical shape. Alternatively, the workpiece 20 may have a shape obtained by dividing a cylindrical member in the circumferential direction, such that instead of a complete circular cross section in the X-Y plane its inner wall 21 has a partial arcuate shape. For example, a plurality of the divided workpieces 20 may be combined to form a cylindrical shape. The workpiece 20 may be attached to the workpiece holding apparatus 110 such that the radial center 23 of the arcuate shape of the workpiece 20 may coincide with the central axis of rotation of the table 108. As a result, the workpiece holding apparatus 110 allows the workpiece 20 itself to rotate about the radial center 23.

The motion control and the rotation control of each component of the processing apparatus 100 and the workpiece holding apparatus 110 may be controlled via I/F circuit 124 by the controlling portion (CPU) 123 within the PC 120. Necessary commands and instructions in the form of data structures for operating the controlling portion 123 with regards to motion control and rotation control of each component of the processing apparatus 100 are stored in the ROM 125. Data relating to the machining mode, 3-dimensional coordinate data for the workpiece 20 and data relating to the rotation speed of the spindle 106 etc. may be input, for example, via a keyboard and stored in the memory (RAM) 122 via the I/F circuit 121. The controlling portion 123 transmits predetermined drive operation commands to each of the motors 126 to 130 based on the stored data, and each of the motors 126 to 130 may perform the predetermined drive operation based on the transmitted signals.

Figure 8:
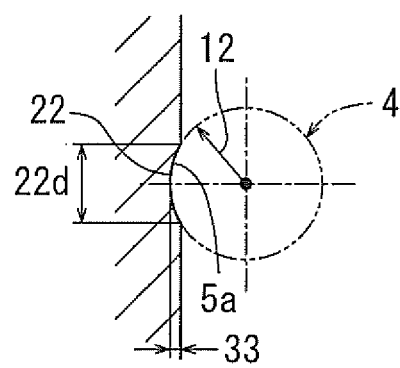
FIG. 8 is a cross sectional view of a dimple formed by a cutting edge portion of the end mill of FIG. 1.

As shown in FIG. 4, the end mill 1 and the workpiece 20 are attached to the processing apparatus 100 and the workpiece holding apparatus 110 respectively such that the central axis 6 of the end mill 1 and the radial center 23 of the workpiece 20 are parallel to each other. Further, the position of the end mill 1 is determined so that the distance between the axis 6 and the radial center 23 of the workpiece 20 is defined to be a predetermined distance. Specifically, the positions for the X-direction and the Y-direction are determined such that only the leading end (radially outermost portion corresponding to the peaks) of the cutting edge portion 5 of the end mill (outer peripheral cutting edges 5a) come into contact with the inner wall 21 of the workpiece 20, as seen in FIG. 2. In this way, with a predetermined distance between the axis 6 and the radial center 23, the depth of the dimple 22 formed in the workpiece may be consistently determined for each dimple formed. For example, as shown in FIGS. 2 and 8, the position of the end mill 1 is determined such that its longitudinal axis 6 is a predetermined distance from the axis 23 of the workpiece, whereby the depth 33 of the dimple 22 may then be determined and consistent across dimples 22 formed when the cutting edge portion 5 has a radius of curvature 12 with a predetermined size.

As shown in FIG. 1, the positions of the end mill 1 as well as the workpiece 20 are determined such that the axis 6 of the end mill 1 and the radial center 23 of the workpiece 20 are parallel. The positions of the end mill 1 relative to the workpiece 20 may be determined such that the leading end (radially outermost portion corresponding to the peaks) of the cutting edge portions 5 of the end mill 1 (outer peripheral cutting edges 5a) come in contact with the inner wall 21 of the workpiece 20. The workpiece 20 is then rotated about the radial center 23 while the end mill 1 is rotated about the axis 6. The rotational speed of the end mill 1 about its longitudinal axis 6 is greater than the feed speed (rotational speed) of the workpiece 20 rotating around radial center 23, and as a result each of the outer peripheral edges 5a of cutting edge portions 5 forms each of the dimples 22 when the end mill 1 rotates.

Figure 6:
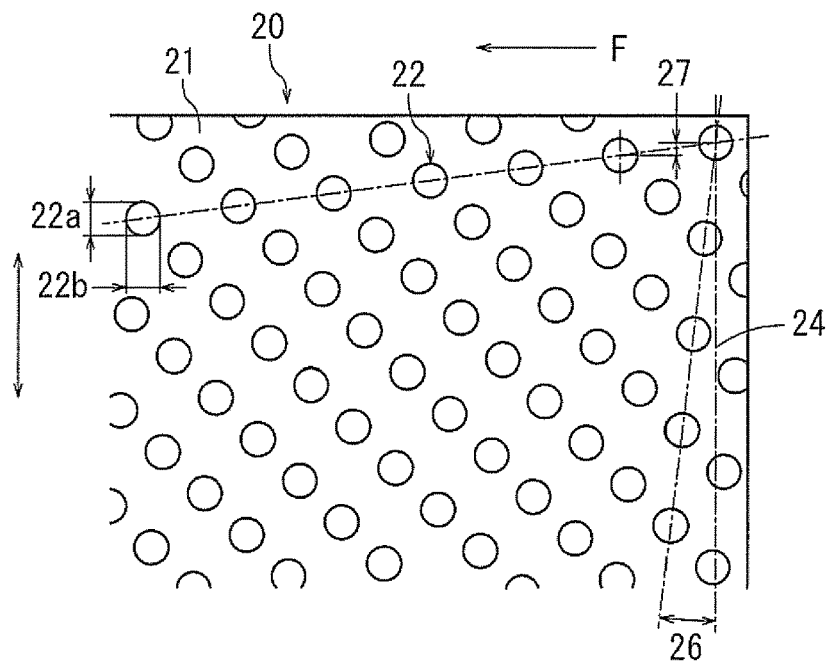
FIG. 6 is a partial enlarged view of the inner surface of the workpiece illustrating the dimples formed with the end mill of FIG. 1.

As shown in FIG. 6, the dimples 22 are formed along a plurality of lines generally extending in the axial direction (Z direction) of the end mill 1 as well as on a plurality of lines extending in the feed direction F (transverse direction). The dimples 22 arranged on the lines extending in the Z direction are not perfectly parallel to the Z direction of the end mill 1, but are rather arranged on lines at a predetermined angle 26 relative to the Z direction (line 24 in the drawings) of the end mill 1. Similarly, the dimples 22 arranged on the lines extending in the feed direction F are not perfectly parallel to the feed direction F of the end mill 1, but are rather arranged on lines at a predetermined angle 27 relative to the feed direction F. The angles 26 and 27 are variable, and are determined based on the rotation speed of end mill 1 about axis 6, as well as the feed speed of the end mill 1 due to the rotation of workpiece 20 around radial center 23, as well as the lead angle 8 shown in FIG. 1. The angles 26 and 27 are smaller than the lead angle 8, for example, and may be approximately a tenth of the lead angle 8.

As shown in FIG. 6, the dimples 22 arranged on the line inclined at angle 26 relative to the Z direction are positioned so as to partially overlap with each other in the feed direction F, offset by a spaced interval in the feed direction F. For example, the positions of two adjacent dimples 22 along the incline 26 relative to the Z direction are displaced in the feed direction F such that approximately half, and more specifically, the one third to one fifth of the diameters 22b of the dimples 22, overlap in the feed direction F. Alternatively, the positions of two dimples 22 may be offset in the feed direction F by a larger width comprising at least the half of the diameter 22b in the feed direction F.

As shown in FIG. 6, the plurality of dimples 22 arranged on the lines inclined at angle 26 relative to the Z direction are successively offset, for example, in the feed direction F. The dimples 22 located at the final end (for example, the lower end in FIG. 6) of the line inclined at angle 26 relative to the Z direction are positioned so as to partially overlap with the dimples 22 located at the front end (upper end in FIG. 6) of the line comprising the plurality of dimples 22 inclined at angle 26 relative to the Z direction that is adjacent to the previously mentioned inclined line, in the feed direction F. Therefore, the positions of the plurality of dimples 22 are relatively offset in the feed direction F so as to be scattered over the entire length of the feed direction F. Further, the dimples 22 arranged on the line inclined at angle 26 relative to the Z direction partially overlap but do not completely overlap with the dimples 22 formed on the adjacent inclined line in the feed direction F. Therefore, collectively, the structural configuration of the plurality of dimples 22 is such that the dimples 22 continuously extend throughout the entire feed direction F due to the partial overlaps described above, wherein the partial overlaps occur consecutively between dimples for the entire length of the feed direction F of the inner wall 21 of the workpiece 20.

The diameter 22b of the dimple 22 in the feed direction F (see FIG. 6) is substantially the same as the width 22e as seen in FIG. 2 when the feed F is 0 (the setting used by the controlling portion 123), wherein said feed setting is determined jointly by the diameter 14 of the main body 4 as well as the depth 33 of cut in the workpiece 20 by the cutting edge (outer peripheral cutting edge) 5a. Specifically, in the case of down-cut (relative to FIG. 2), the feed setting is dependent on the feed speed, where when the feed speed due to the rotation of the workpiece 20 around its radial axis 23 extending in the Z direction is higher, then the diameter 22b of the dimple 22 formed in the feed direction F will be smaller. However, regardless of which feed speed setting is used, the diameter 22b of the dimple 22 in the feed direction F will be substantially the same as the width 22e.

Figure 11:
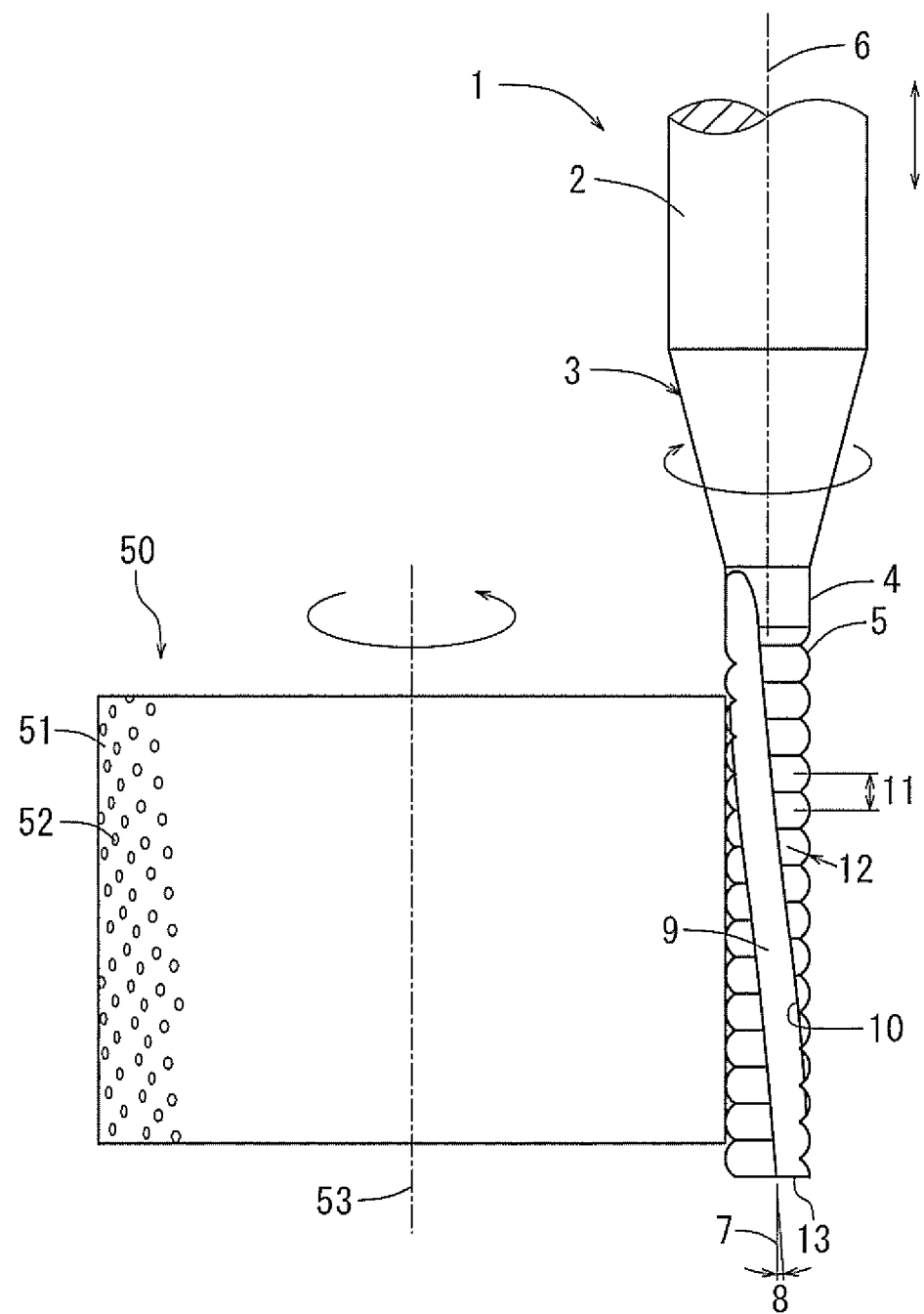
FIG. 11 is a front view of a workpiece having a cylindrical outer wall and the end mill of FIG. 1.

More specifically, during formation of the dimples 22 on the cylindrical inner wall 21, because of the concave configuration of the inner wall relative to the outer peripheral cutting edge 5a carving the dimple, as shown in FIGS. 1 and 2, the diameter 22b of the dimple 22 in the feed direction F is elongated in comparison to where a flat inner surface 21 is used without curvature. Conversely, when forming the dimples 52 on the cylindrical outer wall 51 as shown in FIG. 11, because of the convex configuration of the outer wall relative to the outer peripheral cutting edge 5a carving the dimple, the diameter of the dimple 52 in the feed direction F is reduced in comparison to where a flat inner surface 21 is used without curvature. This is because, due to the mentioned convex curvature, the time in which the cutting edge 5a contacts the outer wall 51 becomes shorter than the time in which the cutting edge 5a contacts the concave inner wall 21.

The diameter 22a (see FIG. 6) of the dimple 22 in the Z direction is substantially the same as the width 22d shown in FIG. 8. The width 22d is determined by the radius of curvature 12 and the depth 33 of the outer peripheral cutting edge 5a (see FIG. 2). The feed speed of workpiece 20 around axis 23, the rotation speed of end mill 1 about its longitudinal axis 6, and the speed in the axial direction of the end mill 1 may be adjusted such that the dimples 22 have a substantially circular shape. More specifically, the radius of curvature 12 may be determined such that the diameter 22b in the feed direction F and the diameter 22a in the axial direction are substantially the same.

The dimples 22 formed by each rotation of the end mill 1, by the same cutting edges 5a (see FIG. 2), are arranged side by side in the feed direction F as shown in FIGS. 1 and 6, partially overlapping in the Z direction. As the end mill 1 moves in the axial direction, the dimples 22 are formed on the line extending at the predetermined angle 27 relative to the feed direction F.

For example, two dimples 22 adjacent in the feed direction F, along the same line extending at the predetermined angle relative to the feed direction F are offset in the Z direction such that approximately half, and more specifically, one third to one fifth of the diameter 22a of each dimple 22 in the Z direction overlap with the adjacent dimple. Alternatively, the positions of two dimples 22 are displaced in the Z direction by a width larger than at least the half of the width of the axial diameter 22a. The positions of the plurality of dimples 22 arranged side by side in the feed direction F are successively displaced, for example, on one side in the Z direction (for example, a lower side).

As shown in FIG. 6, the dimples 22 at the rear end (for example, the dimples closest to the axial edge at the farthest terminal end of the workpiece in the feed direction, e.g. the leftmost axial edge in FIG. 6) of the plurality of dimples 22 arranged on lines extending at the predetermined angle 27 relative to the feed direction F are located such that they partially overlap in the axial direction with the leading dimples 22 (for example, the dimples closest to the axial edge at the closest end to the feed direction F, e.g. the rightmost axial edge in FIG. 6) of the dimples 22 on the adjacent line of dimples in extending at the predetermined angle 27 relative to the feed direction F spaced downward in the Z direction, where the adjacent line is parallel to the previous line. Therefore, collectively, the structural configuration of the plurality of dimples 22 is such that the dimples are offset in the axial direction so as to partially overlap and continuously extend throughout the entire Z direction of the workpiece. Further, the dimples 22 arranged on the line extending in the feed direction F only partially overlap in the axial direction with the dimples 22 on the adjacent line. Further, the dimples 22 are positioned so as to not completely overlap in the axial direction with the dimples 22 on the adjacent line extending at the predetermined angle 27 relative to the feed direction F. Therefore, the plurality of dimples 22 are scattered such that there is at least one dimple 22 located at any point in the entire axial direction.

Figure 7:
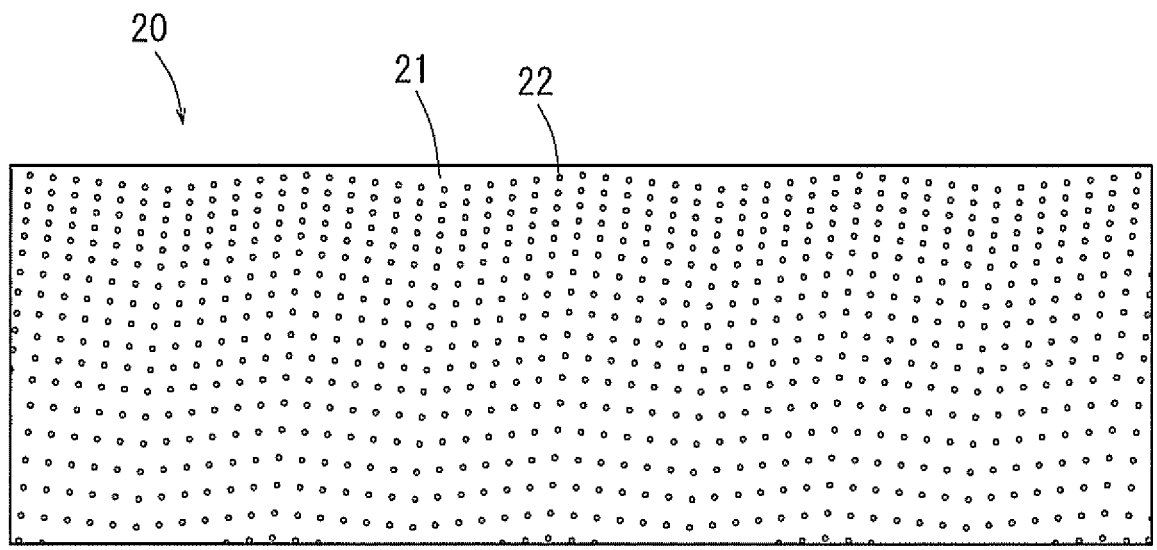
FIG. 7 is a partial view of the inner surface of the workpiece illustrating the dimples formed with the end mill of FIG. 1.

As shown in FIG. 1, the end mill 1 may move in a reciprocating manner in the axial direction. As a result, as shown in FIG. 7, the plurality of dimples 22 arranged side by side in the feed direction are arranged in a corrugated line or a zigzag line. In particular, the positions of the plurality of dimples 22 adjacent side-by-side in the feed direction F may be determined so as to be positioned in lines comprised of patterns of repeated concave circular arc subunits, repeated convex circular arc subunits, repeated triangular subunits, sine curve subunits or cosine curve subunits.

As described-above, the dimples 22 are formed by the end mill (rotary cutting tool) 1. More specifically, as shown in FIG. 1, the end mill 1 having a plurality of the cutting edges 5 on the surface of the rod-shaped main body 4 is moved relative to the workpiece in the feed direction F and orthogonal to the axis 6 of the end mill 1 along the workpiece 20 while being rotated about its longitudinal axis 6. The end mill 1 also moves relative to the workpiece 20 in the axial Z direction during the relative movement in the feed direction F. In this way, the plurality of dimples 22 are formed on the workpiece 20 so as to be spaced apart from each other. The plurality of dimples 22 arranged side by side in the feed direction F are formed to partially overlap with each other and are displaced at an offset distance from each other in the axial direction.

Therefore, as shown in FIG. 6, the plurality of dimples 22 arranged side by side along lines extending at the predetermined angle 27 relative to the feed direction F are located in a spaced apart offset manner while partially overlapping in the axial direction (vertical direction). Therefore, the dimples 22 along said lines are distributed along the Z direction of the workpiece 20 and may be arranged such that at least one dimple 22 must always cover any specific point in the Z direction of workpiece 20.

Consequently, when a counter piece in contact with the workpiece 20 is moved relative to the workpiece 20 in the feed direction F, the large part of the counter piece is affected by the dimples 22 distributed throughout the entire Z direction, at every point along said direction. More specifically, the abrasion powder generated between the workpiece 20 and the counter piece may be shifted in the feed direction F upon movement of the counter piece, and may be captured in any of the dimples 22 distributed in the axial direction. Alternatively, the squeezing effect, as described above, where oil is filled between the workpiece and the counter piece such that oil may be filled within the dimples 22, may be caused by the dimples 22, and may be generated in a distributed manner in the axial direction. As a result, the frictional resistance between the workpiece 20 and the counter piece may be reduced and the wear resistance of the workpiece 20 may be improved.

As shown in FIGS. 1 and 6, the plurality of dimples 22 adjacent to each other in the feed direction F on the lines extending at the predetermined angle 27 relative to the feed direction F are formed with the same cutting edge portions 5 by moving the end mill 1 relative to the workpiece 20 in the feed direction while rotating about its longitudinal axis 6. Each of the dimples 22 has an axial width in the Z direction. The axial shift in the Z direction of the cutting edge portions 5 of the end mill 1 per one rotation about the axis 6 is less than the axial width of the dimple. As a result, the plurality of dimples 22 adjacent to each other in the feed direction F on lines extending at the predetermined angle 27 relative to the feed direction F are located in an axially offset manner such that they partially overlap in the Z direction.

As shown in FIG. 1, the plurality of the cutting edge portions 5 are arranged on the surface of the main body 4 of the end mill 1 and are arranged side by side, stacked in the Z direction on the slanted lead edge line 10 disposed at the lead angle 8 with respect to the line parallel to the axis 6. As shown in FIG. 6, the plurality of the axially adjacent dimples 22 along the lines extending at the predetermined angle 26 relative to the Z direction are arranged in an axially offset manner via movement of the end mill 1 relative to the workpiece 20 in the feed direction F while rotating about its longitudinal axis 6.

Therefore, the plurality of the cutting edge portions 5 on the lead edge line 10 successively come in contact with the workpiece 20 by rotation of the end mill 1 about its longitudinal axis 6. Consequently, the plurality of dimples 22 are arranged side by side in the Z direction along the line inclined at the angle 26 with respect to the Z direction, where for example, angle 16 is a smaller angle than the lead angle 8, by movement of the end mill 1 relative to the workpiece 20 in the feed direction F, via rotation about its longitudinal axis 6 flush against the workpiece 20.

As shown in FIG. 6, the plurality of dimples 22 arranged side by side in the Z direction are formed to partially overlap and be displaced with respect to each other in the feed direction F along the line extending at the angle 26 with respect to the axial direction. Therefore, the dimples 22 are distributed along the entire extent of the feed direction F of the workpiece 20 and may be arranged such that at least one dimple 22 must always cover any specific point in the Z direction of the workpiece 20.

Therefore, when a counter piece is moved relative to the workpiece 20 in the Z direction, the large part of the counter piece is affected by the dimples 22 distributed covering the entire extent the feed direction F. More specifically, the abrasion powder generated between the workpiece 20 and the counter piece may shift in the Z direction and may be captured in any of the dimples 22 distributed in the feed direction F. Alternatively, the squeezing effect, which may be caused by the dimples 22 and the oil as described above, may be also generated in a distributed manner across the entire extent of the feed direction F. As a result, in a manner analogous to the previous squeezing effect described above, the frictional resistance between the workpiece 20 and the counter piece may be reduced and the wear resistance of the workpiece may be improved.

As shown in FIG. 1, the workpiece 20 has the inner wall 21 with a cylindrical or a circular arc cross-section in the XY plane. The end mill 1 is installed along the workpiece 22 such that the radial center 23 of the inner wall 21 of the workpiece 20 extending in the Z direction is parallel to the axis 6 of the end mill 1. The dimples 22 are formed on the inner wall 21 by moving the end mill 1 relative to the work piece 20 along the inner wall of the workpiece 20 in the feed direction F as well as in a reciprocating manner in the Z direction while the end mill 1 rotates about its longitudinal axis 6.

Therefore, the plurality of dimples 22 arranged side by side in the feed direction F along the line extending at the predetermined angle 27 relative to the feed direction F are located in an offset manner with respect to each other while partially overlapping in the Z direction of the workpiece 20. If a columnar or cylindrical counter piece, which is inserted into the cylindrical workpiece 20, is rotated in the circumferential direction, then the counter piece is affected by the dimples 22 in a large surface area by the distributed dimples 22 along the lines extending at the predetermined angle relative to the feed direction F, collectively covering the entire axial direction of workpiece 20. As a result, the frictional resistance between the workpiece 20 and the counter piece is reduced.

Further, as shown in FIG. 1, the end mill 1 is moved relative to and along the workpiece 20 in the feed direction F and orthogonal to the axis 6 while the end mill (rotary cutting tool) 1 is rotated about its longitudinal axis 6. As a result, the plurality of dimples 22 spaced apart from each other are formed on the workpiece 20. The plurality of the cutting edge portions 5 are arranged on the surface of the main body 4 of the end mill 1 and are arranged side by side, stacked in the Z direction on the lead edge line 10 with the lead angle 8 with respect to the line parallel to the axis 6. The plurality of dimples are formed side by side on the line extending axially at the angle 26 with respect to the axial direction (see FIG. 6) by moving the end mill 1 in the feed direction F via rotation of end mill 1 about its longitudinal axis 6 flush against the surface of the inner wall 21 of the workpiece 20, as shown in FIG. 1.

As shown in FIG. 1, the end mill 1 includes a rod-shaped main body 4, grooves 9 formed on the surface of the main body 4 at the lead angle 8 with respect to the line parallel to the axis 6 of the main body 4, and a plurality of the cutting edge portions 5 continuously formed along the grooves 9 at the predetermined axial distance 11 as described above. As shown in FIGS. 1 and 3, the cutting edge portions 5 are adjacent to the groove 9 and have a shape protruding in a circular arc from the main body 4 in a R-Z cross sectional plane as described above that includes the axis 6.

Therefore, the plurality of the cutting edges 5a along the grooves 9 successively come in contact with the workpiece 20 when the end mill 1 is rotated about its longitudinal axis 6. Subsequently, the plurality of dimples 22 are arranged side by side on the line at the angle 26 with respect to the Z direction when the end mill 1 is moved relative to the workpiece 20 in the feed direction F. The angle 26 corresponds to, for example, about one tenth of the lead angle 8. Further, since the cutting edges 5a have a circular arc shape in the R-Z cross sectional plane as described, they encounter a minimal amount of stress concentration when the workpiece 20 is cut. For example, comparatively, they receive less stress concentration than a triangular shape or the like, therefore preventing damage to the cutting edge portions 5.

As shown in FIG. 3, the circular arc shape of the outer peripheral cutting edges 5a of the cutting edge portions 5 has the radius of curvature 12. When the radius (half of the length of the diameter 14 of the cutting edge portion 5 in the XY plane) and the radius of curvature 12 in the R-Z plane are substantially equal (for example, when the radius of curvature 12 is dimensioned 70 to 130% of the radius of the main body 4), then the shape of the dimples 22 may be configured to be in a substantially perfect circular shape. The directivity of the frictional coefficient generated between the workpiece 20 and the counter piece may be reduced by configuring the dimples 22 to have a substantially circular shape. However, the dimples do not need to be configured to have a circular shape when such reduction of directivity is not necessary. Specifically, the ratio of the radius of curvature to the size of the radius of the main body is not limited to, but may be one eight, one quarter, one half, double, four times, or eight times and may be oval instead of substantially circular. When the shape of the outer peripheral cutting edge is a convex flat blade, the dimple will have a rectangular shape.

As shown in FIG. 6 etc., the surface area ratio of the area covered by the dimples 22 to the surface area covered by the surface of the inner wall 21 upon which the dimples 22 are formed, is 10 to 40%. When the area ratio of the dimples 22 is larger than 40%, the contact area of the workpiece 20 with the counter piece is reduced due to greater coverage by the dimples, resulting in an increase in the pressure at the contact area. This is undesirable because it may in turn increase of the amount of wear. On the other hand, when the area ratio of the dimples is less than 10%, the total area of the dimples 22 will be reduced. This is undesirable because the frictional resistance is too high cannot be sufficiently reduced. Accordingly, it is desirable to keep the surface area ratio of the dimples 22 to the surface area to be processed at 10 to 40%.

As shown in FIG. 1, the end mill 1 rotates such that only the leading ends (outermost radial regions including peaks) of the cutting edge portions 5 come in contact with the workpiece 20 to form the dimples 22. Therefore, the dimples 22 may be relatively shallow so that the load applied to the cutting edge portions 5 during dimple formation will be reduced. As a result, burr formation on the workpiece 20 is prevented, and therefore, the inner wall 21 of the workpiece 20 in the Z direction along the circumferential surface of the inner wall 21 can be easily maintained flat.

As shown in FIG. 1, the plurality of the cutting edge portions 5 are distributed in an offset manner overlapping yet spaced apart in the circumferential direction along the outer periphery of the main body 4 of the end mill 1 at the leading angle 8. Consequently, the outer peripheral cutting edges 5a of the plurality of the cutting edge portions 5 successively cut the workpiece 20 with a time lag corresponding to said circumferential offset when the end mill 1 rotates. Therefore, the necessary force to be applied to the end mill 1 at any one point in time during rotation will be smaller than the case where the plurality of the outer peripheral edges 5a of the cutting edge portions 5 are not offset circumferentially, and come into contact with the workpiece 20 at once. As a result, the deformation of end mill 1 during processing is reduced and durability of the end mill 1 is improved. Additionally, the deflection of the end mill 1 during processing is reduced and the dimples 22 can be formed at accurate locations.

The exemplary embodiments of the present invention have been described with reference to the above-described configurations, however, it is apparent to those skilled in the art that various alternations, modifications and changes can be made without departing from the scope of the present invention. Therefore, the exemplary embodiments of the present invention may include various alternations, modifications and changes without departing from the spirit and object of the appended claims. The exemplary embodiments of the present invention are not limited to the specific configurations and modifications may be made as will be described infra.

Figure 9:
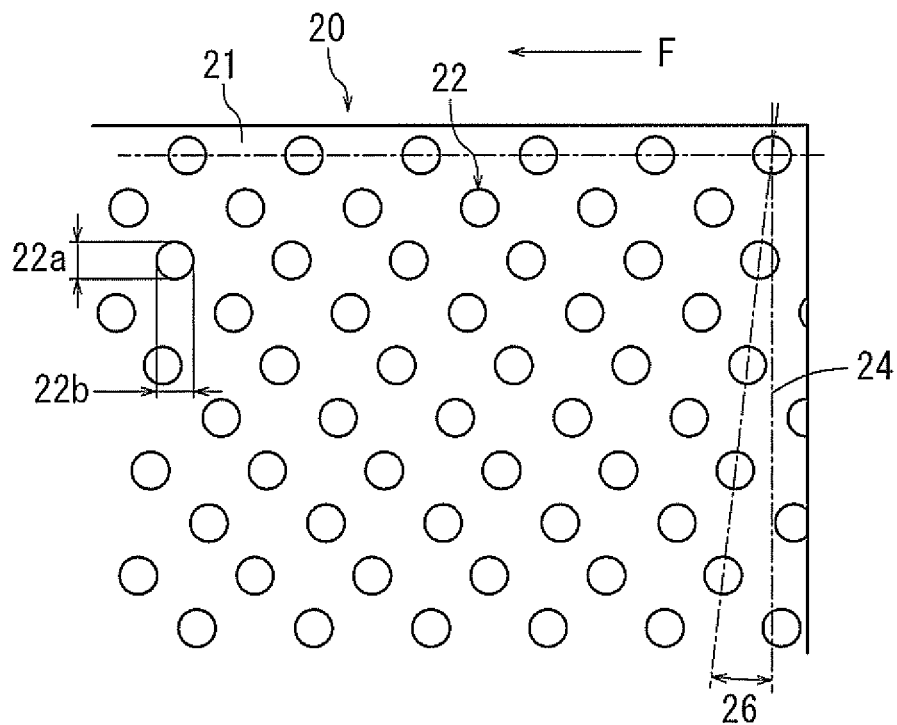
FIG. 9 is a partial enlarged view of the workpiece when dimples are formed without moving the end mill of FIG. 1 in an axial direction.

It is also possible to form the plurality of dimples 22 in the workpiece 20 using the end mill 1 shown in FIG. 1 such that the dimples 22 may be formed on the inner wall 21 of the workpiece 20 as shown in FIG. 9. As shown in FIG. 9, the plurality of dimples 22 are arranged side by side along lines in the feed direction F, resulting in no axial offset or axial displacement for adjacent dimples 22 in the feed direction, in contrast to FIG. 6. On the other hand, similar to FIG. 6, the plurality of dimples 22 arranged side by side in the Z direction along lines extending at the predetermined angle 26 relative to the Z direction may be offset while partially overlapping each other in the feed direction F.

The end mill 1 and the workpiece 20 are arranged such that the longitudinal axis 6 of the end mill 1 and the radial center 23 of the workpiece arc 20 extending in the Z direction are parallel to each other as shown in FIG. 1 when the plurality of dimples 22 are formed as shown in FIG. 9. The end mill 1 is moved relative to the workpiece 20 in a feed direction F orthogonal to the position of the longitudinal axis 6 of the end mill 1. The workpiece 20 is rotated around the radial center 23 thereof. At this time, the end mill 1 is rotated about the axis 6 but is not moved reciprocally in the axial direction. In this way, the plurality of dimples 22 are formed in the distributed manner as shown in FIG. 9.

The plurality of dimples 22 arranged side by side in the Z direction as shown in FIG. 9 are offset while partially overlapping in the feed direction F. As a result, collectively, the dimples 22 are distributed along the entire feed direction F and may be arranged such that at least one dimple 22 must always cover any specific point in the feed direction F spanning the entire workpiece 20. Consequently, when a counter piece is moved relative to the workpiece 20 in the axial direction, the large part of the counter piece is affected by any of the dimples 22 distributed in the feed direction F. More specifically, the abrasion powder generated between the workpiece 20 and the counter piece may shift in the axial direction and may be captured in any of the dimples 22 distributed in the feed direction F.

Figure 10:
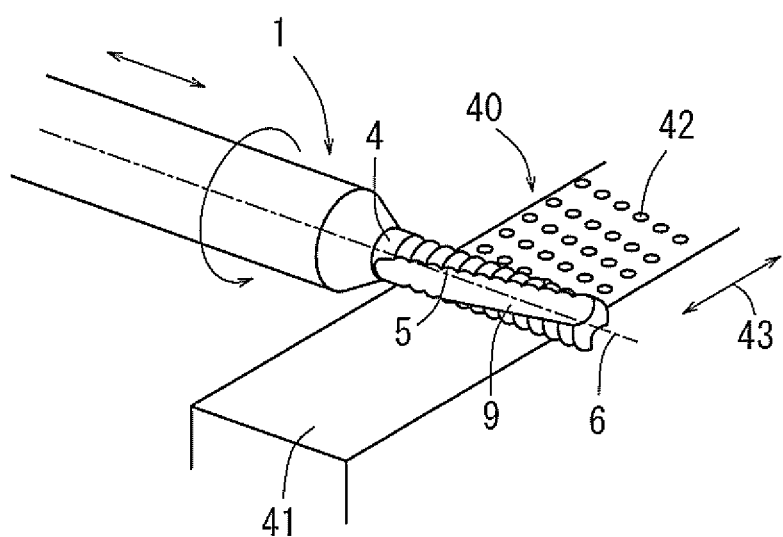
FIG. 10 is a perspective view of a workpiece with a flat surface and the end mill of FIG. 1.

The dimples 42 may also be formed on the workpiece 40 shown in FIG. 10 as an alternative to the workpiece 20 shown in FIG. 1. The workpiece 40 is, for example, in the form of a plate, with a flat planar surface 41. The surface 41 has a rectangular shape having, for example, two parallel long edges and two parallel short edges. The end mill 1 is installed flush against said workpiece such that the longitudinal axis 6 of end mill 1 is orthogonal to the long edges of the workpiece 40. The end mill 1 rotates about its longitudinal axis 6 while flush against workpiece 40 and is thus shifted relative to the workpiece 40 in a longitudinal direction along the longer edges.

As shown in FIG. 10, the end mill 1 may be also moved in the axial direction (reciprocally up/down parallel to its longitudinal axis 6) while the end mill 1 is moved relative to the workpiece 40 in the longitudinal direction (feed direction) 43. The end mill 1 is moved up and down reciprocally in a predetermined cycle in the axial direction of longitudinal axis 6. In this way, the dimples 42 are distributed similar to the dimples 22 in FIG. 6 in both an axial direction and a feed direction F. As a result, the dimples 42 arranged side by side in the axial direction of the end mill 1 are located in an offset manner while partially overlapping with respect to each other in the feed direction. Similarly, the dimples 42 arranged side by side in the longitudinal direction 43 (feed direction) are located in an offset manner while partially overlapping with respect to each other in the axial direction.

The dimples 52 may be formed on the workpiece 50 shown in FIG. 11 as an alternative to the workpiece 20 shown in FIG. 1. The workpiece 50 has a cylindrical or columnar shape having a cylindrical outer wall 51 with a convex shape. The end mill 1 is installed such that its longitudinal axis 6 is parallel to the radial center 53 of the workpiece 50 extending in the Z direction. The end mill 1 is rotated about its longitudinal axis 6 while the workpiece 50 is rotated around the radial center 53 in the same or opposite direction to the end mill 1 (clockwise or counterclockwise). Simultaneously, the end mill 1 is moved in the axial direction up and down along its longitudinal axis 6 in a reciprocating manner. Such reciprocating motion is carried out in a predetermined cycle.

In this way, the dimples 52 may be distributed in the axial direction as well as the feed direction F in a manner similar to the dimples 22 in FIG. 6. The dimples 52 arranged side by side in the axial direction of the end mill 1 may be located in an offset manner while partially overlapping with respect to each other in the feed direction F. Additionally, the dimples 52 arranged side by side in the feed direction F may be located in an offset manner while partially overlapping with respect to each other in the axial direction.

Therefore, the plurality of dimples 52 are located in an offset manner while being partially overlapping in the axial direction as well as in the circumferential feed direction F of the workpiece 50. A curved counter piece contacting the outer surface 51 of the workpiece is affected widely by the dimples 52 distributed in the axial direction when the workpiece 50 is rotated in the circumferential feed direction F with respect to the counter piece into which the workpiece 50 may be inserted. Similarly, such a counter piece is affected widely by the dimples 52 distributed in the circumferential feed direction F when the workpiece 50 is moved in the axial direction. As a result of wide dimple coverage in both the circumferential and axial directions, the frictional resistance between the workpiece and the counter piece may be reduced when the outer wall 51 of the workpiece 50 moves along the counter piece.

Figure 12:
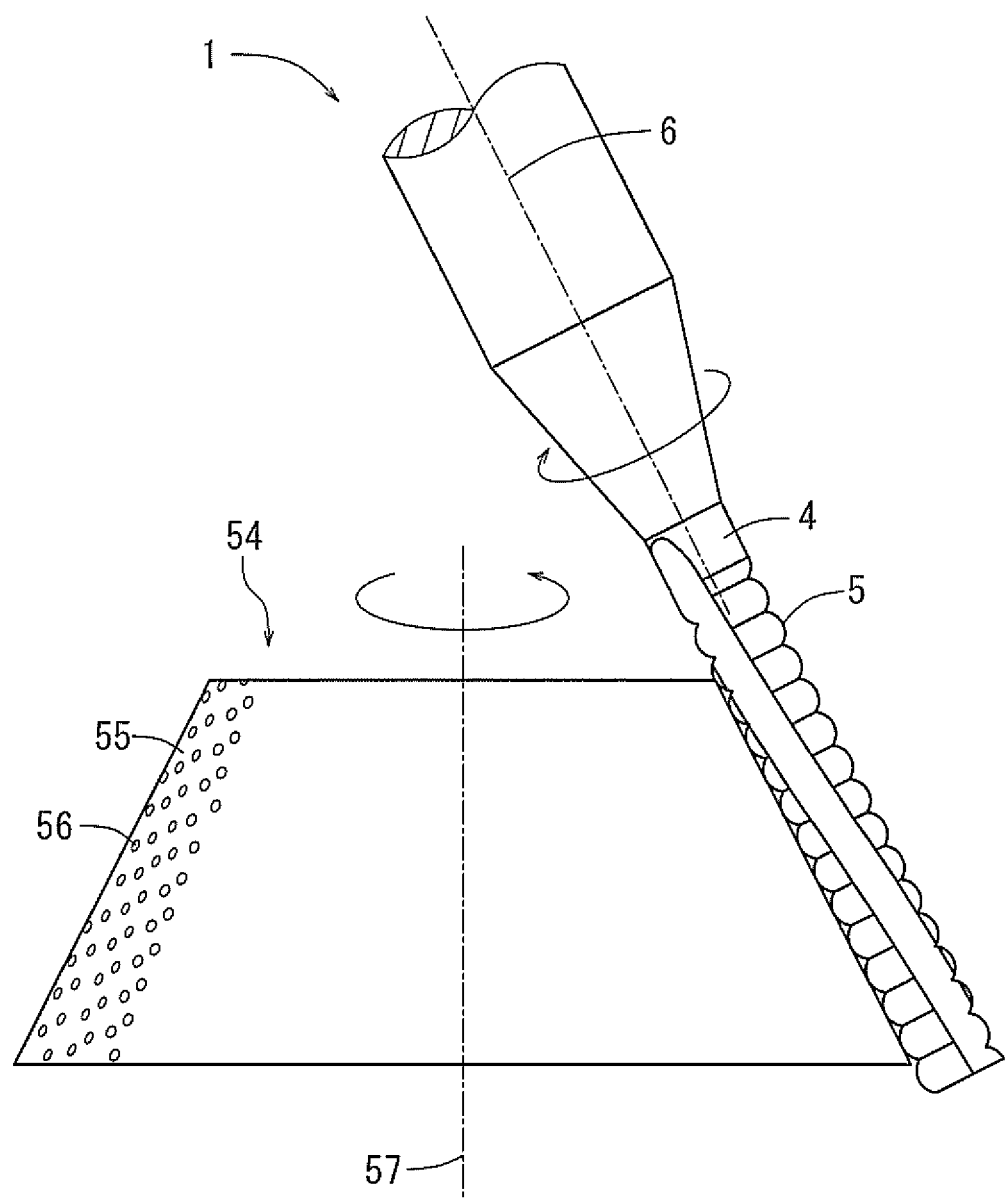
FIG. 12 is a front view of a workpiece having a truncated conical outer wall and the end mill of FIG. 1.

The dimples 56 may be formed on the workpiece 54 shown in FIG. 12 as an alternative to the workpiece 20 shown in FIG. 1. The workpiece 54 is in a truncated conical or cone shape having an outer wall 55 in a fan shape when developed. The end mill 1 is installed such that its longitudinal axis 6 is able to extend flush against the outer surface 55 of the workpiece 54. The workpiece 54 is rotated around its radial center 57 extending in the Z direction, as depicted by the curved arrow around axis 57 in FIG. 12 (can be clockwise or counterclockwise) while the end mill 1 is rotated in the opposite direction (counterclockwise or clockwise, respectively, opposite to the direction of rotation of workpiece 54) to the workpiece 54 about the axis 6. At the same time, the end mill 1 is moved in parallel to the outer surface 55 of the workpiece 54 flush against said the outer surface 55 circumferentially about axis 57, as well as reciprocally in the axial direction. The end mill 1 is moved in said reciprocating manner up and down along the axial direction in a predetermined cycle.

Consequently, the dimples 56 are distributed in the axial direction as well as the feed direction F in a manner similar to the dimples 22 in FIG. 6. The dimples 56 arranged side by side in the axial direction of the end mill 1 are offset while partially overlapping with respect to each other in the circumferential feed direction F. The dimples 56 arranged side by side in the feed direction F orthogonal to the axial direction are located offset while partially overlapping with respect to each other in the axial direction following the vertical incline (e.g. the right edge of 55 parallel to longitudinal axis 6 in FIG. 12) circumferentially around the outer surface 55 of the inverted truncated conical workpiece 54.

Figure 13:
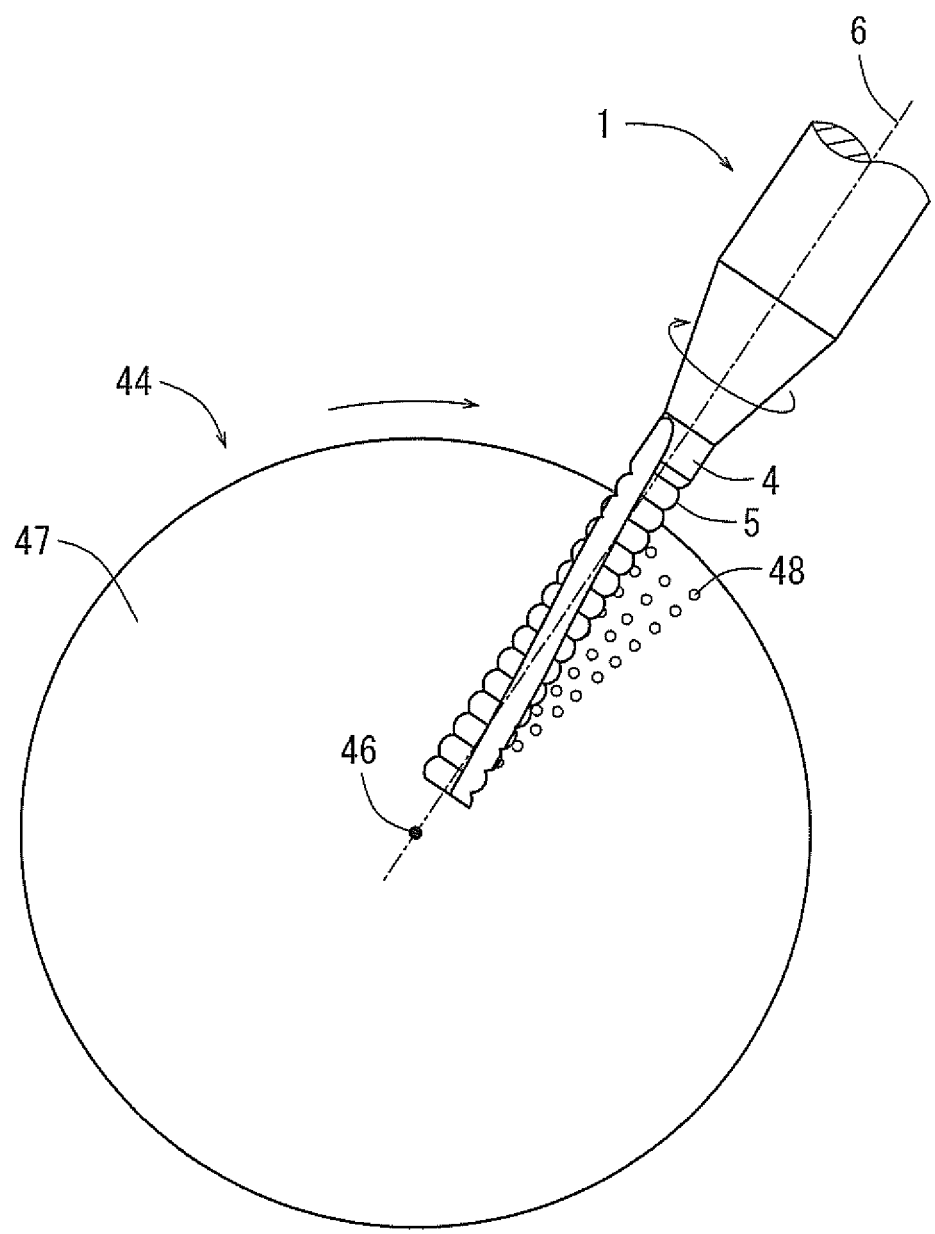
FIG. 13 is a front view of a workpiece with a circular disc surface and the end mill of FIG. 1.

The dimples 48 may be formed on the workpiece 44 shown in FIG. 13 as an alternative to the workpiece 20 shown in FIG. 1. The workpiece 44 may be of a circular disc form and may have a flat circular planar surface 47. The end mill 1 placed flush against surface 47 with the axis 6 extending parallel to the surface 47 of the workpiece 44 in the radial direction passing through the center 46 of workpiece 44 to an outer radial end of the workpiece 44 in a straight line, as shown by the line of the longitudinal axis 6 of end mill 1 in FIG. 13. The workpiece 44 is rotated about its center 46 while the end mill 1 is rotated about the axis 6 of the end mill 1 in the direction in accordance with the rotation of the workpiece 44. Simultaneously, the end mill 1 is moved reciprocally in the axial direction (radially outward and inward along the radial direction of the longitudinal axis 6 against the workpiece 44) of the end mill 1 along the surface 47 of the workpiece 44. The end mill 1 is moved reciprocally in a predetermined cycle in the radial direction.

In this way, the dimples 48 may be distributed in the axial direction (radial direction of the workpiece 44) as well as the feed direction F in a manner similar to the dimples 22 in FIG. 6. For example, the dimples 48 arranged side by side in the axial direction may be located offset while partially overlapping with respect to each other in the circumferential feed direction. The dimples 48 arranged side by side in the feed direction F (circumferential direction) are also offset while partially overlapping with respect to each other in the axial radial direction.

Figure 14:
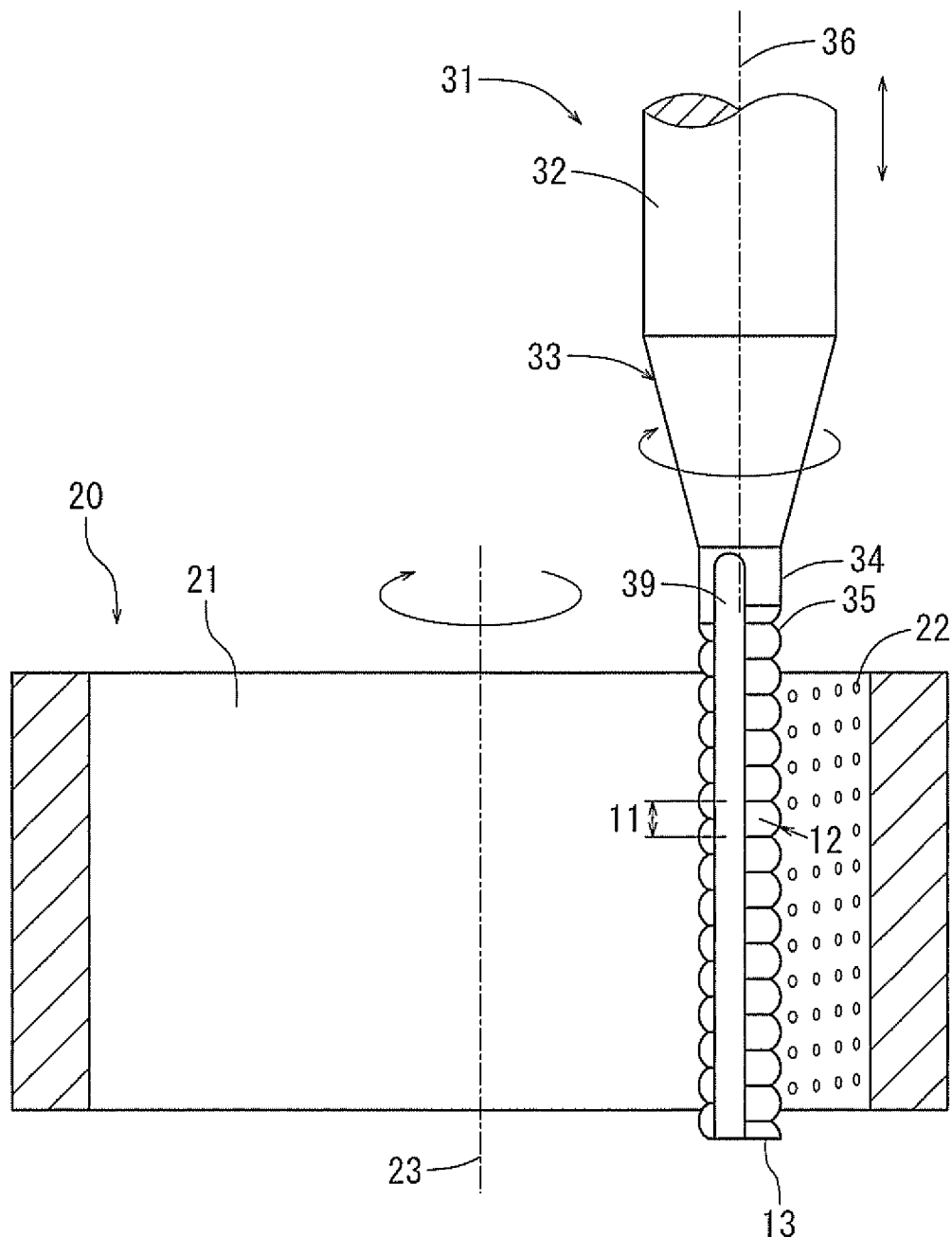
FIG. 14 is a cross sectional view of a workpiece having a cylindrical inner wall and a front view of an end mill according to another embodiment.

Dimples 22 may be formed by an end mill 31 shown in FIG. 14 as an alternative to the end mill 1 shown in FIG. 1. As shown in FIG. 14, the end mill 31 may include grooves 39 which do not curve in the circumferential direction around the main body 34, but are without a lead angle, compared to the grooves 9 shown in FIG. 1 having the lead angle 8. The end mill 31 includes a shank 32, a connecting portion 33, and a main body 34, which extend in the Z direction, in a coaxial manner relative to the longitudinal axis 36. Two linearly extending grooves 39, extending in the Z axial direction, and not the circumferential direction, may be formed on the main body 34. The grooves 39 do not have a lead angle and extend parallel to axis 36 in the Z direction. The groove 39 has a predetermined width and extends over substantially the entire length of the main body 34 in the Z direction.

As shown in FIG. 14, each outer peripheral cutting edge may be formed at the edge of the intersection between the cutting edge portion 35 and the edge of the corresponding groove 39. Each outer peripheral cutting edge has a corrugated shape and includes continuous circular arc peak portions corresponding to the radially outermost point of cutting edge portions 35, while trough portions corresponding to the radially innermost point are located midway in between the peak portions in the Z direction. The peak portions define each of cutting edge portions 35, which protrude from the main body 34 in a radial direction. Arcs corresponding to the outer peripheral cutting edges in the XY plane are positioned so as to be symmetrical about the axis 36. In the Z direction, consecutive cutting edge portions 35 are spaced apart by, for example, half of the height of each cutting edge portion 35.

Figure 15:
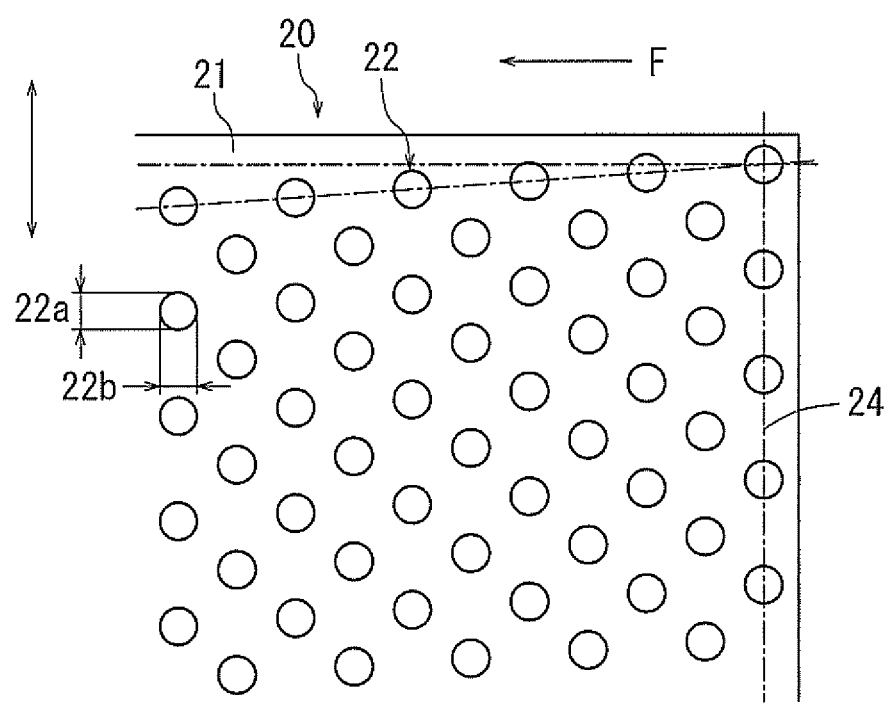
FIG. 15 is a partial enlarged view of the workpiece of FIG. 14 illustrating the dimples formed by the end mill of FIG. 14.

As shown in FIG. 14, the end mill 31 and the workpiece 20 are set such that the longitudinal axis 36 of the end mill 1 and the radial center 23 of the workpiece 20 are oriented parallel to each other. The end mill 31, flush against the workpiece 20, is moved relative to the workpiece 20 in the direction tangential and orthogonal to the axis 36. The workpiece 20 is rotated about the radial center 23. At this time, the end mill 31 also moves reciprocally in the Z direction. Consequently, the dimples 22 are distributed as shown in FIG. 15. The plurality of dimples 22 arranged side by side in the feed direction F along a line extending at a predetermined angle relative to the feed direction F as shown in FIG. 15 are not parallel to the feed direction F but are offset while partially overlapping with respect to each other in the axial direction. On the other hand, the plurality of dimples 22 arranged side by side in the axial direction are located in parallel to the axial direction, thus being not offset or displaced in the feed direction with respect to each other.

As shown in FIG. 15, the dimples 22 are distributed along the entire Z direction when the workpiece 20 is viewed in the feed direction F, such that along any point in the Z direction at least one dimple 22 must always be found when the workpiece 20 is viewed in the feed direction F. Therefore, the large part of a counter piece contacting the workpiece 20 is affected by any of the dimples 22 distributed in the axial direction when the counter piece is moved relative to the workpiece 20 in the feed direction F. More specifically, the abrasion powder generated between the workpiece 20 and the counter piece may be shifted in the feed direction F and may be captured in any of the dimples 22 distributed in the axial direction. Alternatively, the squeezing effect, as described above, where oil is filled between the workpiece and the counter piece such that oil may be filled within the dimples 22, may be caused by the dimples 22, and may be generated in a distributed manner in the axial direction. As a result, the frictional resistance between the workpiece 20 and the counter piece may be reduced and the wear resistance of the workpiece 20 may be improved.

Figure 16:
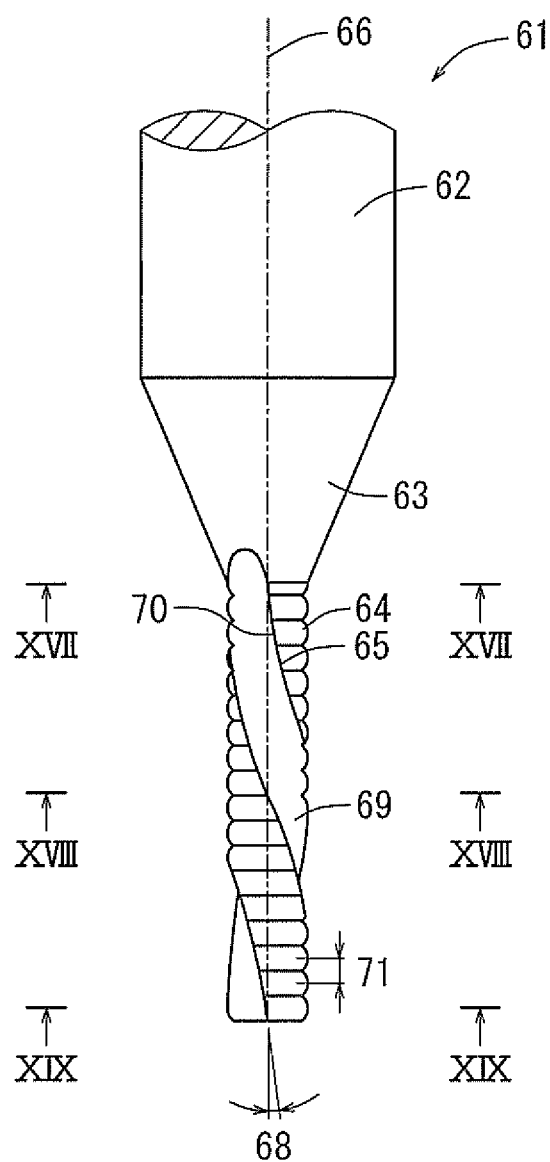
FIG. 16 is a front view of an end mill according to another embodiment.
Figure 17:
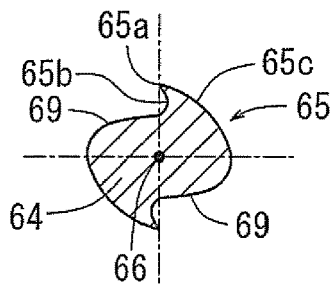
FIG. 17 is a cross sectional view of the end mill of FIG. 16 taken along the line XVII-XVII of FIG. 16.
Figure 18:
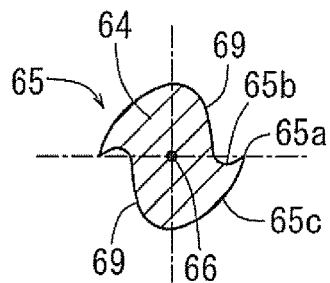
FIG. 18 is a cross sectional view of the end mill of FIG. 16 taken along the line XVIII-XVIII of FIG. 16.
Figure 19:
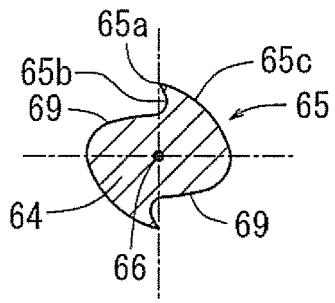
FIG. 19 is a bottom view of the end mill of FIG. 16 taken along the line XIX-XIX of FIG. 16.

Dimples may be formed by an end mill 61 shown in FIG. 16, as an alternative to the end mill 1 shown in FIG. 1. The end mill 1 shown in FIG. 1 includes the grooves 9 having the lead angle 8. Each groove 9 extends along substantially a half of the circumference of the main body 4, from top to bottom of the main body 4 in the Z direction. On the other hand, the end mill 61 shown in FIG. 16 includes a groove 69 having a larger lead angle 68. As a result, the groove 69 extends circumferentially along main body 64 to substantially cover its entire circumference, from top to bottom of the main body 64 in the Z direction.

The end mill 61 shown in FIG. 16 includes a shank 62, a connecting portion 63 and a main body 64 which extend in the Z direction, in a coaxial manner relative to the axis 66, parallel to the Z direction. Two grooves 69 are provided on the main body 64. Each groove 69 is helically formed on the outer periphery of the main body 64, circumferentially covering the entire circumference of main body 64 as described, and has the lead angle 68 with respect to the line parallel to the axis 66. In particular, the groove 69 may linearly extend at a lead angle 68 with respect to the axis 66, around the outer radial peripheral surface of the main body 64, when the main body 64 is developed. The lead angle 68 is determined, for example, to be 10 to 40 degrees. Each groove 69 has a predetermined width, and is formed over substantially the entire circumference of the main body 64 as described.

Figure 20:
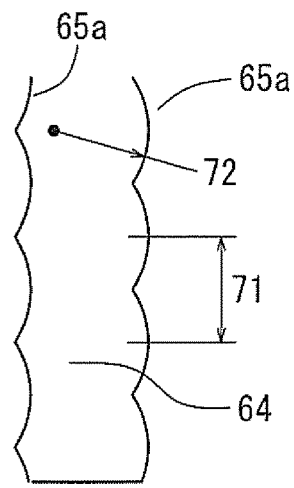
FIG. 20 is a projected view of the outer peripheral edge of the end mill of FIG. 16 when a part of the end mill is viewed in a radial direction.

As shown in FIGS. 16 to 20, the groove 69 extends at the top of the main body 64 to a leading end at the bottom of the main body 64 in a counterclockwise direction (when viewed from the top to the bottom of FIG. 16, along the Z axial direction). The plurality of the cutting edge portions 65 stacked side by side in the Z direction are formed along one leading edge 70 of the groove 69, and are arranged in the Z direction at a predetermined distance between the outermost radial peaks of adjacent cutting edge portions 65, where said portions project radially from the main body 64 in a circular arc shape. As shown in FIG. 20, the outer peripheral cutting edge portions 65a of the cutting edge portions 65 have a circular arc shape having a radius of curvature 72 in the R-Z cross section, where R is the direction from the radial center extending in the Z axial direction, to where the cutting edge portion 65 intersects with the leading edge 70.

As shown in FIGS. 17 to 20, a pair of cutting edge portions 65 are located on the main body 64 on opposite diagonal sides about the radial center 66 extending in the Z direction, and similarly each groove 69 is located between the pair of the cutting edge portions 65, facing the other groove 69 on the opposite diagonal side of the radial center 66. Each of the cutting edge portions 65 includes a circular arc flank face 65c extending in the circumferential direction, an outer peripheral cutting edge 65a located at one terminal circumferential end of the flank face 65c, and a rake face 65b extending radially inward from the outer peripheral cutting edge 65a toward the axis 66 and the groove 69. The flank face 65c extends in a substantially circular arc manner along the outer periphery of the main body 64 in the circumferential direction. More specifically, the flank face 65c has a configuration such that the outer peripheral cutting edge 65a of face 65c is located at a circumferential terminal end of the arc of face 65c farthest away from the axis 66, where in traversing face 65c from 65a to the opposite circumferential end of the arc of 65c, the distance to axis 66 gradually decreases. The rake face 65b is configured in a planer shape or a curved shape.

The dimples may be arranged side by side in the axial direction extending along a line inclined at a predetermined angle relative to the axial direction when formed using the end mill 61 shown in FIG. 16. The predetermined angle is, for example, larger than the angle 26 shown in FIG. 6 and may have, for example, a dimension of angle substantially two times larger.

The helical direction of the grooves 9, 69 wrapping circumferentially around the respective end mills 1, 61 is in a counterclockwise direction when the main bodies 4, 64 are viewed top to bottom in the Z axial direction from the shanks 2, 62. The main bodies 4, 64 are rotated in a clockwise direction during dimple formation about their respective longitudinal axes. Alternatively, the helical direction of the grooves 9, 69 around the end mills 1, 61 may also be in a clockwise direction, in which case the main bodies 4, 64 may be rotated in the clockwise direction about their respective longitudinal axes when forming the dimples.

The workpiece formed with the dimples may be used for various components. For example, they may be used for cylinders of an engine, pistons, crank shafts, turbochargers. Alternatively, they may be used for components of compressors, joint surfaces of artificial joints. When the workpiece has a configuration obtained as a divided subunit of a cylindrical shape, a plurality of divided workpieces may collectively be assembled so as to be used as the cylindrical shape.

The end mills 1, 31, 61 include grooves 9, 39, 69 and plurality of the cutting edge portions 5, 35, 65 are formed along the grooves 9, 39, 69. Alternatively, the end mills 1, 31, 61 may not include the grooves 9, 39, 69 but instead may have the plurality of the cutting edge portions protruding from the outer circumference of the main body. The plurality of the cutting edge portions may be arranged side by side along the lead edge line that has the lead angle with respect to the line parallel to the axis of the main body. Alternatively, they may be arranged stacked in the Z direction parallel to the longitudinal axis of the main body.

The end mills 1, 31, 61 include the plurality of the cutting edge portions 5, 35, 65 continuously arranged side by side in the circumferential direction. Alternatively, the end mills may include the plurality of the cutting edge portions scattered on the outer radial peripheral surface, still stacked in the Z direction a before, but not adjacent in the circumferential direction.

The end mills 1, 31, 61 include two lines of the cutting edge portions 5, 35, 65. Alternatively, the end mills may have one or more than three lines of the cutting edge portions.

The end mills 1, 31, 61 are solid, in which the main bodies 4, 34, 64 and the cutting edge portions 5, 35, 65 are integrally formed with respect to each other. Alternatively, end mill may have cutting edge portions formed by tips attached to the main body. The tips may be brazed to the main body or may be attached to the main body in a replaceable manner.

In the above-described embodiments, the end mill is moved relative to the workpiece in the circumferential feed direction F by rotating the workpiece during dimple formation where the workpiece is rotated in the feed direction F about its radial center. Alternatively, the end mill may be moved relative to the workpiece in the feed direction while the workpiece is fixed. For example, the end mill may be attached to the device such as a jointed-arm robot or the like. The end mill may be moved by said device along the configuration of the inner wall or outer wall of the workpiece in the feed direction F while the end mill is simultaneously rotated about its longitudinal axis. At this time, the end mill may also be moved reciprocally in the axial direction up and down relative to its longitudinal axis.

In the above embodiments, the end mills 1, 31, 61 are moved reciprocally in the axial direction when forming the dimples. Alternatively or additionally, the workpiece may be moved reciprocally in the axial direction with respect to the end mill.

Surface treatment may be applied on the surface of the workpiece formed with the dimples. The surface treatment may include, for example, chromium, nickel, titanium based plating, or coating by PVD, CVD or the like, and application of a diamond CVD, DLC, carbon, graphite, resin, molybdenum disulfide or the like.

The plurality of the cutting edge portions 5, 65 are arranged side by side in the circumferential direction on the lead edge line of the grooves, having the respective lead angles 8, 68. Alternatively, instead of the grooves, the plurality of the cutting edge portions may be configured so as to be arranged side by side on a curved line on the main body of the expanded end mill, and the curve line may have a predetermined angle with respect to the longitudinal axis.

The dimples have a shape that opens in a substantially circular shape on the surface of the workpiece. Alternatively, the dimples may have a shape that opens in the surface of the workpiece in an elliptical shape, an egg shape, a square shape, a rhombic shape, a hexagonal shape, or the like.

The cutting edge portions 5, 35, 65 are adjacent to the grooves 9, 39, 69 and protrude in a circular arc manner from the main body 4, 34, 64 along the R-Z cross section. The circular arc shape may include not only a perfect circle but also an ellipse or the like. Further, the cutting edge portions may also have a triangular shape or convex flat surface as alternatives to the circular arc shape.

In the above-described embodiments, the plurality of the cutting edge portions 5, 35, 65 are arranged side by side in the Z direction with a constant interval 11, 71 between adjacent cutting edge portions. Alternatively, the plurality of the cutting edge portions 5, 35, 65 may be arranged side by side in the Z direction at unequal intervals between adjacent cutting edge portions.

In the above-described embodiments, two diagonally opposing outer peripheral edges are provided in the XY plane and said two edges are offset in the Z axial direction, for example, by a distance corresponding to a substantially half of the interval between adjacent cutting portions in the Z direction of the cutting edge portions 5, 35, 65. Alternatively, the two diagonally opposed outer peripheral edges may not be displaced in the axial direction and the cutting edge portions of each of the outer peripheral edges may be arranged adjacently in the circumferential direction, coplanar in the XY plane.

In the above-described embodiments, the dimples are formed by the end mills 1, 31, 61 as the rotary cutting tools having the shank 2, 32, 62 and the connecting portion 3, 33, 63. Alternatively, the dimples may be formed using a milling cutter without a shank and a connecting portion.

According to the embodiments in FIGS. 10 to 13, the end mill 1 is shifted reciprocally in the axial direction when forming the dimples. Alternatively, the dimples may be formed without shifting the end mill 1 in the axial direction.

The invention claimed is:

1. A dimple processing method for forming dimples on a workpiece with a rotary cutting tool, the method comprising:
    (a) rotating the rotary cutting tool about a longitudinal axis of the rotary cutting tool and moving the rotary cutting tool along a workpiece in a feed direction oriented orthogonal to the longitudinal axis, wherein the rotary cutting tool has a plurality of cutting edges on a radially outer surface of a rod-shaped main body of the rotary cutting tool, wherein the plurality of cutting edges are arranged axially side by side on a lead edge line of the rotary cutting tool, and wherein the lead edge line extends helically about the longitudinal axis; and
    (b) moving the rotary cutting tool relative to the workpiece in an axial direction parallel to the longitudinal axis during step (a) to form a plurality of dimples on the workpiece, wherein each dimple on the workpiece is spaced apart from each other dimple on the workpiece, and wherein a first set of the plurality of dimples are arranged side by side in the feed direction and are offset in the axial direction while partially overlapping with each other in the axial direction.

2. The dimple processing method of claim 1, wherein the first set of the plurality of dimples arranged side by side in the feed direction are formed by the same cutting edges of the rotary cutting tool, wherein each of the plurality of dimples has a height measured in the axial direction, and wherein the rotary cutting tool is moved in the axial direction a distance that is less than the height during each rotation of the rotary cutting tool about the longitudinal axis.

3. The dimple processing method of claim 1, wherein the lead edge line is oriented at a lead angle relative to a line parallel to the longitudinal axis of the rotary cutting tool, and wherein a second set of the plurality of dimples formed on the workpiece are arranged side by side in the axial direction on a line oriented at a predetermined angle inclined relative to the axial direction.

4. The dimple processing method of claim 3, wherein the second set of the plurality of dimples arranged side by side in the axial direction partially overlap in the feed direction and are offset relative to each other in the feed direction.

5. The dimple processing method of claim 1, wherein the workpiece includes a concave inner wall or a convex outer wall, wherein the concave inner wall or the convex outer wall has a cylindrical or a circular arc cross-section;
    wherein the rotary cutting tool moves along the workpiece with the longitudinal axis oriented parallel to the inner wall or the outer wall of the workpiece, and
    wherein the plurality of dimples are formed on the inner wall or the outer wall as the rotary cutting tool is moved simultaneously in the feed direction and the axial direction along the inner wall or the outer wall of the workpiece while the rotary cutting tool is rotated about the longitudinal axis.

6. The dimple processing method of claim 1, wherein the feed direction of the rotary cutting tool is curved.

7. The dimple processing method of claim 1, wherein moving of the rotary cutting tool in the axial direction is reciprocal movement along the longitudinal axis performed in a predetermined cyclical manner.

8. The dimple processing method of claim 3, wherein the first set of the plurality of dimples are arranged side by side in the feed direction on a line at a predetermined angle inclined relative to the feed direction.

9. The dimple processing method of claim 3, wherein the predetermined angle is about one tenth of the lead angle.

10. The dimple processing method of claim 8, wherein the first set of the plurality of dimples arranged side by side in the feed direction are offset in the axial direction such that one third to one fifth of the diameter of each dimple in the axial direction overlaps with the adjacent dimple.

11. A dimple processing method for forming dimples on a workpiece with a rotary cutting tool, the method comprising:
   (a) rotating the rotary cutting tool about a longitudinal axis of the rotary cutting tool and moving the rotary cutting tool along a workpiece in a feed direction oriented orthogonal to the longitudinal axis, wherein the rotary cutting tool has a plurality of cutting edges on a radially outer surface of a rod-shaped main body of the rotary cutting tool, wherein the plurality of cutting edges are arranged axially side by side on a lead edge line of the rotary cutting tool, and wherein the lead edge line extends helically about the longitudinal axis; and
   (b) moving the rotary cutting tool relative to the workpiece in an axial direction parallel to the longitudinal axis during step (a) to form a plurality of dimples on the workpiece, wherein the plurality of dimples are spaced apart relative to each other on the workpiece, and wherein a first set of the plurality of dimples are arranged side by side in the feed direction and are offset in the axial direction while partially overlapping with each other in the axial direction;
   wherein the workpiece includes a concave inner wall or a convex outer wall, wherein the concave inner wall or the convex outer wall has a cylindrical or a circular arc cross-section;
   wherein the rotary cutting tool moves along the workpiece with the longitudinal axis oriented parallel to the inner wall or the outer wall of the workpiece, and
   wherein the plurality of dimples are formed on the inner wall or the outer wall as the rotary cutting tool is moved simultaneously in the feed direction and the axial direction along the inner wall or the outer wall of the workpiece while the rotary cutting tool is rotated about the longitudinal axis.

12. The dimple processing method of claim 11, wherein the first set of the plurality of dimples arranged side by side in the feed direction are formed by the same cutting edges of the rotary cutting tool, wherein each of the plurality of dimples has a height measured in the axial direction, and wherein the rotary cutting tool is moved in the axial direction a distance that is less than the height during each rotation of the rotary cutting tool about the longitudinal axis.

13. The dimple processing method of claim 11, wherein the lead edge line is oriented at a lead angle relative to a line parallel to the longitudinal axis of the rotary cutting tool, and wherein a second set of the plurality of dimples formed on the workpiece are arranged side by side in the axial direction on a line oriented at a predetermined angle inclined relative to the axial direction.

14. The dimple processing method of claim 13, wherein the second set of the plurality of dimples arranged side by side in the axial direction partially overlap in the feed direction and are offset relative to each other in the feed direction.

15. The dimple processing method of claim 11, wherein the feed direction of the rotary cutting tool is curved.

16. The dimple processing method of claim 11, wherein moving of the rotary cutting tool in the axial direction is reciprocal movement along the longitudinal axis performed in a predetermined cyclical manner.

17. The dimple processing method of claim 13, wherein the first set of the plurality of dimples are arranged side by side in the feed direction on a line at a predetermined angle inclined relative to the feed direction.

18. The dimple processing method of claim 13, wherein the predetermined angle is about one tenth of the lead angle.

19. The dimple processing method of claim 17, wherein the first set of the plurality of dimples arranged side by side in the feed direction are offset in the axial direction such that one third to one fifth of the diameter of each dimple in the axial direction overlaps with the adjacent dimple.

* * * * *